(12) United States Patent
Bono et al.

(10) Patent No.: US 11,612,839 B2
(45) Date of Patent: Mar. 28, 2023

(54) SYSTEMS, DEVICES, AND METHODS FOR POINT-OF-USE TESTING FOR FLUID CONTAMINATION

(71) Applicant: Massachusetts Institute of Technology, Cambridge, MA (US)

(72) Inventors: Michael S. Bono, Somerville, MA (US); Sydney B. Beasley, Cambridge, MA (US); Emily Barret Hanhauser, Brookline, MA (US); Chintan Vaishnav, Belmont, MA (US); Anastasios John Hart, Waban, MA (US); Rohit Nandkumar Karnik, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 982 days.

(21) Appl. No.: 16/341,326

(22) PCT Filed: Oct. 18, 2017

(86) PCT No.: PCT/US2017/057265
§ 371 (c)(1),
(2) Date: Apr. 11, 2019

(87) PCT Pub. No.: WO2018/075689
PCT Pub. Date: Apr. 26, 2018

(65) Prior Publication Data
US 2020/0047093 A1 Feb. 13, 2020

Related U.S. Application Data

(60) Provisional application No. 62/409,541, filed on Oct. 18, 2016.

(51) Int. Cl.
*G01N 1/10* (2006.01)
*B01D 35/06* (2006.01)
*B01L 3/00* (2006.01)

(52) U.S. Cl.
CPC ........ *B01D 35/06* (2013.01); *B01L 3/502715* (2013.01); *G01N 1/10* (2013.01);
(Continued)

(58) Field of Classification Search
CPC ............... B01D 35/06; B01L 3/502715; B01L 2300/0681; G01N 1/10; G01N 2001/1062; G01N 2001/1056
(Continued)

(56) References Cited

U.S. PATENT DOCUMENTS

2004/0014023 A1   1/2004   Meserol et al.
2008/0078256 A1   4/2008   Christie et al.
(Continued)

FOREIGN PATENT DOCUMENTS

CA   2853985 A1   12/2015
JP   H02112752   *   4/1990
(Continued)

OTHER PUBLICATIONS

Ahmer, BMM, "Cell-to-cell signalling in *Escherichia coli* and *Salmonella enterica*.", Molecular Biology, vol. 52, Issue 4, pp. 933-945, 2004 (13 pages).
(Continued)

*Primary Examiner* — Robert R Raevis
(74) *Attorney, Agent, or Firm* — Barnes & Thornburg LLP

(57) ABSTRACT

Systems, devices, and methods for detecting contamination (e.g., bacteria) in fluid are provided. The systems, devices, and methods allow for filtering a fluid sample using a filter to capture and concentrate cells (e.g., bacteria) to detect
(Continued)

electrochemical properties thereof. The cells can be exposed to a reagent that diffuses into the cells to produce a product of interest that can be used in analysis of the fluid sample. The product of interest can diffuse out of the filter into a fluid storage component for detection and analysis by an analysis component. After the sampling is completed, the filter can be detached and discarded. Other aspects of the present disclosure, including enhancements and various systems and methods for concentrating cells and analyzing the same, are also provided.

21 Claims, 10 Drawing Sheets

(52) U.S. Cl.
CPC ............... *B01L 2300/0681* (2013.01); *G01N 2001/1062* (2013.01)

(58) Field of Classification Search
USPC .................. 73/53.01, 61.41, 61.43, 61.44, 73/61.71–61.73, 64.56, 863.21, 864.21; 436/174, 180; 422/68.1, 78, 79, 82.01, 422/82.02
See application file for complete search history.

(56) References Cited

U.S. PATENT DOCUMENTS

| | | |
|---|---|---|
| 2011/0003328 A1 | 1/2011 | Gerritse et al. |
| 2011/0223583 A1 | 9/2011 | Gordon et al. |
| 2018/0245123 A1 | 8/2018 | Mitra et al. |

FOREIGN PATENT DOCUMENTS

| | | |
|---|---|---|
| WO | 2017027956 A1 | 2/2017 |
| WO | 2018045449 A1 | 3/2018 |

OTHER PUBLICATIONS

Bain, R et al., "A Summary Catalogue of Microbial Drinking Water Tests for Low and Medium Resource Settings.", International Journal of Environmental Research and Public Health, vol. 9, Issue 5, pp. 1609-1625, 2012 (17 pages).

Cao, Y et al., "Synthesis of a Molecularly Imprinted Polymer on Silica-Gel Surfaces for the Selective Adsorption of Indole from Fuel Oil.", Adsorption Science & Technology, vol. 31, Issue 6, pp. 489-502, 2013 (15 pages).

Cochran, WG, "Estimation of Bacterial Densities by Means of the 'Most Probable Number'", Biometrics, vol. 6, Issue 2, pp. 105-116, Jun. 1950 (13 pages).

Garthright, WE et al., "FDA's preferred MPN methods for standard, large or unusual tests, with a spreadsheet.", Food Microbiology, vol. 20, pp. 439-445, 2003 (7 pages).

Gunda, NSK et al., "A hydrogel based rapid test method for detection of *Escherichia coli* (*E. coli*) in contaminated water samples.", Analyst, vol. 141, Issue 10, pp. 2920-2929, 2016 (11 pages).

Gunda, NSK et al., "Mobile Water Kit (MWK): a smartphone compatible low-cost water monitoring system for rapid detection of total coliform and *E. coli*.", Analytical Methods, vol. 6, No. 16, pp. 6139-6590, Aug. 21, 2014 (12 pages).

International Search Report and Written Opinion for Application No. PCT/US17/57265, dated Jan. 12, 2018 (11 pages).

Laczka, O, et al., "Amperometric detection of Enterobacteriaceae in river water by measuring ß-galactosidase activity at interdigitated microelectrode arrays.", Analytica Chimica Acta, vol. 677, pp. 156-161, 2010 (6 pages).

Liu, X et al., "High-throughput imaging of bacterial colonies grown on filter plates with application to serum bactericidal assays.", Journal of Immunological Methods, vol. 292, pp. 187-193, 2004.

Panasyuk, TL et al., "Electropolymerized Molecularly Imprinted Polymers as Receptor Layers in Capacitive Chemical Sensors.", Analytical Chemistry, vol. 71, pp. 4609-4613, 1999 (5 pages).

Pandey, R et al., "Indole: a novel signaling molecule and its applications.", Indian Journal of Biotechnology, vol. 12, pp. 297-310, 2013.

Rissin, DM et al., "Single-molecule enzyme-linked immunosorbent assay detects serum proteins at subfemtomolar concentralions," Nature Biotechnology, vol. 28, Issue 6, pp. 595-599, Jun. 2010 (6 pages).

Schets, FM et al., "Comparison of indole production and ß-glucuronidase activity for the detection of *Escherichia coli* in a membrane filtration method", Letters in Applied Microbiology, vol. 13, pp. 272-274, 1991 (3 pages).

Stauber C et al., "Evaluation of the compartment bag test for the detection of *Escherichia coli* in water," Journal of Microbiological Methods, vol. 99, pp. 66-70, 2014 (5 pages).

Togo, CA et al., "Novel detection of *Escherichia coli* β-D-glucuronidase activity using a microbially-modified glassy carbon electrode and its potential for faecal pollution monitoring.", Biotechnology Letters, vol. 29, pp. 531-537, 2007 (7 pages).

Tryland, I et al., "Enzyme Characteristics of β-D-Galactosidase- and β-D-Glucuronidase-Positive Bacteria and Their Interference in Rapid Methods for Detection of Waterborne Coliforms and *Escherichia coli*.", Applied and Environmental Microbiology, vol. 64, Issue 3, pp. 1018-1023, 1998 (6 pages).

\* cited by examiner

SYSTEMS, DEVICES, AND METHODS FOR POINT-OF-USE TESTING FOR FLUID CONTAMINATION

CROSS REFERENCE TO RELATED APPLICATION

The present disclosure claims priority to U.S. Provisional Application No. 62/409,541, entitled "Method of Point-of-use Testing for Bacteriological Water Contamination in Resource-Limited Environments," which was filed on Oct. 18, 2016, and which is incorporated by reference herein in its entirety.

FIELD

The present disclosure relates to point-of-use systems, devices, and methods for detecting contamination (e.g., bacteria) in fluid, and more particularly relates to operating systems and devices to make contamination detections electrochemically.

BACKGROUND

Water quality management is a pressing problem in many resource-limited environments, such as developing countries and rural areas even in non-developing countries. Water consumers in these environments frequently lack awareness of water contamination and remediation methods, and drinking water contamination is sufficiently dispersed and context-dependent that it is frequently necessary for remediation to be initiated at the community level rather than within the government. This is especially true for bacterial contamination, which is widespread in drinking water and can arise from a combination of natural phenomena and inappropriate practices for sanitation and water handling.

To the extent solutions exist for removing bacteria from water, they suffer from a variety of deficiencies. For example, some existing methods for testing water for bacterial contamination require overnight incubation to provide sufficient samples to test for bacteria. This long delay in providing test results make it difficult to treat the contaminated water, leading to the consumption of contaminated water when the need for water is pressing. By way of further example, existing tests are also not sufficiently accurate. The lack of reliability influences the impact the tests have on the population, causing people to drink contaminated water either because they were wrongly informed the water was fine or because they ignore the test results indicative of contamination because they do not trust the results. In practice, many rural users' awareness of water quality is limited to whether the water looks, smells, and tastes clean, with little or no knowledge of whether their water had been tested before.

The central technical problem in developing improved point-of-use testing for bacterial contamination in drinking water is the low required limit of detection. Existing World Health Organization guidelines for safe water are no $E.\ coli$ or thermotolerant coliform bacteria detected in 100 mL water. To meet this standard, tests must have a limit of detection of 1 cell per 100 mL or 0.01 cells per mL. Existing testing technology accomplishes this limit of detection by culturing water samples via incubation for at least 18 to 24 hours to increase the number of viable cells for testing. While some technology exists that does not require incubation, e.g., colorimetric detection, which requires cloud-based image analysis for quantitation of bacterial concentration, it relies upon technology that is too sophisticated and/or expensive to operate for point-of-use testing in resource-limited environments by an individual.

Accordingly, there is a need for point-of-use water testing systems, devices, and methods that can provide same-day, or even immediate or near-immediate results, is accurate, and can be owned and operated by an individual in a resource-limited environment. Further, it would be beneficial if such systems, devices, and methods were affordable and included portions that were reusable. Additionally, any new systems, devices, and methods preferably would not rely upon ingredients or other technology or materials that would not be readily available to the public and would not be hazardous for the environment. Still further, systems, devices, and methods that can both provide information about the amount of contamination, and provide additional recommendations about what course of action should be taken in view of the information (e.g., drink the water, treat the water, dispose of the water, etc.) would also be helpful.

SUMMARY

The systems, devices, and methods provided for in the present disclosure are directed to detecting levels of contamination in a fluid, such as detecting levels of bacteria in water. The disclosures can be practiced on-site, including by an individual (such a resident of a dwelling), to determine how contaminated a fluid is, and, based on that determination, a course of action can be recommended or otherwise performed by the user. The present disclosures operate much more rapidly than existing contamination systems and devices, thus allowing for testing and subsequent actions to be performed quickly, such as in a manner of minutes or hours, as opposed to a manner of many hours or days.

Generally the systems, devices, and methods provide for ways of concentrating the cells (e.g., bacteria) of a fluid sample to be concentrated in one or more regions within at least one filter. One or more reagents can be supplied to the concentrated cells to produce one or more products of interest that can be subsequently analyzed for purposes, for example, of determining contamination levels in the fluid sample. The present disclosure provides for a variety of ways by which the reagent(s) can be supplied to the concentrated cells. For example, the reagents can be disposed within the filter(s) prior to introducing the sample and configured such that the sample can activate the reagents. In some such embodiments, the reagents can be microencapsulated and released in response to contact with the fluid sample for a certain period of time, a particular temperature being reached, etc. By way of further example, the reagents can be deposited in the filter(s) after cells are already concentrated in the filter(s). By way of even further non-limiting example, the reagents can be deposited at another location that allows them to be activated and diffuse to the filter(s) for interaction with the concentrated cells. In some such embodiments, the reagents can be associated with a binder that is deposited on one or more electrodes used to analyze the product(s) of interest. The fluid sample can pass through the filter(s) and contact the binder on the electrode(s), causing the reagent(s) to diffuse into the filter(s) and interact with the concentrated cells.

The product(s) of interest can be analyzed in a variety of ways, including by measuring electrochemical properties of the product(s) of interest using one or more electrodes. The measured electrochemical properties can be communicated to a user and/or remote device (e.g., a computer, a mobile device, a smartphone, etc.), such as by way of a reader and/or a display, or other information related to the measured electrochemical properties can be communicated to the user and/or remote device. Action can then be taken in response to the measured properties and/or related information. For example, a user can decide to drink the water, treat the water, and/or dispose of the water based on the communicated results.

One exemplary embodiment of a system for sampling fluid includes at least one filter disposed in a filter housing, a fluid storage chamber, at least one electrode, and one or more reagents. The filter housing includes an inlet and an outlet. The fluid storage chamber is in fluid communication with the at least one filter, and the at least one electrode is also in fluid communication with the at least one filter. The one or more reagents is located in at least one of the filter housing, the at least one filter, and one or more electrodes of the at least one electrode. The filter housing and the at least one filter are configured such that one or more cells (e.g., bacteria) contained within a fluid sample that is passed into the filter housing via the inlet becomes located in at least one concentration disposed in the filter housing and reacts with the one or more reagents to produce one or more redox species. The one or more redox species are part of fluid from the fluid sample and other material that passes out of the filter housing via the outlet. Further, the one or more electrodes of the at least one electrode is configured to measure one or more electrochemical properties of the produced one or more redox species.

In some embodiments, the inlet and outlet of the filter housing can be disposed on a first end and a second of the filter housing, respectively, with the filter(s) being disposed therebetween. The first and second ends can be opposed to each other, although they do not have to be so situated. The filter housing and the filter(s) can be configured such that a fluid sample that is passed into the filter housing moves from the inlet, through the filter(s), through the outlet, and into the fluid storage chamber. In some other embodiments, the fluid storage chamber can be in fluid communication with the inlet of the filter such that fluid passed into the filter is passed from the fluid storage container. In some embodiments, the inlet and the outlet share the same fluid path between the filter(s) and the fluid storage chamber. The filter can include one or more chemicals disposed in it that are configured to be electrochemically detected to provide information about whether the filter has been previously used for filtering a fluid sample.

The at least one concentration region can include a plurality of concentration regions. For example, one or more concentration regions of the plurality of concentration regions can be configured to receive a designed fraction of the fluid sample, and the at least one electrode can be configured to measure a concentration of redox species generated by one or more cells within a fluid sample located in the one or more concentration regions. The received fraction of the fluid sample can include an expected number of cells (e.g., bacteria) in the one or more concentration regions that is one of zero cells and one cell for a sample concentration range of interest of the fluid sample.

The fluid storage chamber can include both a first portion and a second portion, with the first portion being disposed closer to the filter(s) than the second portion. The second portion can have a width or diameter that is narrower than a width or diameter of the second portion. The electrode(s) can be disposed proximate to the first portion.

In some embodiments, the fluid storage chamber includes a syringe having a housing that defines the fluid storage chamber and a plunger disposed within the fluid storage chamber. The syringe can be configured such that moving the plunger away from the filter(s) draws a fluid sample through the inlet and into the filter, and fluid from the fluid sample and other material are passed out of the outlet, towards the electrode(s), and into the fluid storage chamber. In alternative embodiments in which the fluid storage chamber includes a syringe having a housing that defines the fluid storage chamber and a plunger disposed within the fluid storage chamber, the syringe can be configured such that moving the plunger towards the filter(s) pushes a fluid sample containing one or more cells (e.g., bacteria) through the inlet and into the filter, and fluid from the fluid sample and other material are passed out of the outlet, towards the electrode(s).

The system can include a fluid introducer that is configured to introduce a fluid sample into the inlet of the filter housing. The fluid introducer can include a pump. In some instances, the fluid introducer includes the fluid storage chamber. In some such instances, the fluid introducer can include a syringe or a gravity-driven flow from the fluid storage chamber. The system can also include a temperature controller. The temperature controller can be disposed proximate to the filter(s) and be configured to regulate a temperature of one or more cells (e.g., bacteria) contained within a fluid sample located in the concentration region(s) disposed in the filter housing.

In some embodiments, a membrane and/or a coating can be included as part of the system. The membrane and/or coating can be located in a variety of location, including: (1) disposed in the filter housing; (2) disposed on one or more electrodes of the at least one electrode; and (3) disposed between one or more electrodes of the at least one electrode and at least one of the inlet, the outlet, and the filter(s). The membrane and/or coating can be configured to allow at least one of the one or more redox species and the one or more reagents to diffuse through the membrane and/or coating. Further, the membrane and/or coating can be configured to limit a passage of at least one of one or more particles and one or more molecules in the fluid sample on the basis of one or more properties of the respective particle(s) and molecule(s).

The reagent(s) of the system can be provided for in a variety of manners. For example, at least one reagent of the one or more reagents can be encapsulated in one or more other materials that are configured such that the at least one reagent of the one or more reagents is dissolved into the fluid sample after a specified amount of time has passed once the one or more other materials of the at least one encapsulated reagent has been contacted by the fluid sample. By way of further example, at least one reagent of the one or more reagents can be encapsulated in one or more other materials that are configured such that the at least one reagent of the one or more reagents is dissolved into the fluid sample after a temperature of the one or more other materials reaches a threshold value. By way of still further example, at least one reagent of the one or more reagents can be disposed within one or more polymeric microcapsules, with the polymeric microcapsule(s) being configured to dissolve when contacted by a fluid sample that has been advanced towards the filter(s). The polymeric microcapsules(s) can be disposed within the filter(s), among other locations. By way of yet another example, at least one reagent of the one or more reagents can be at least partially embedded within a binder that is configured to dissolve when contacted by a fluid sample that has been passed into the filter(s). The binder can be disposed on a surface of the at least one electrode. The binder can include, by way of non-limiting examples, a gum or one or more polysaccharides. By way of further example, at least one reagent of the one or more reagents can include a powder and/or a capsule.

The electrode(s) can include a working electrode and a reference electrode, with the working electrode being the electrode of the two that is disposed closer to the filter(s). In some embodiments, the electrode(s) can include a working electrode, a counter electrode, and a reference electrode, with no particular configuration related to their location with respect to the filter(s) being indicated.

The system can include a display, with the display having a data communication link with the electrode(s). The display can be configured to display data related to the one or more measured electrochemical properties. In some embodiments, the fluid can include a reader. The reader can have at least one of a power supply, a display, a data interface, electronic circuitry for performing electrochemical measurements, and electronic circuitry for controlling temperature. The reader can be configured to be removably coupled to at least one of the filter housing and the at least one electrode.

The system can include each of a filtering component and a fluid storage component. In some such embodiments, the filtering component can include the filter housing and the filter, and the fluid storage component can include the fluid storage container. The filtering component can be removably and replaceably coupled to the fluid storage component such that the fluid storage component can be reused by coupling a second filtering component that includes at least one filter to the fluid storage component. In some such embodiments, the fluid storage component can include the at least one electrode. Alternatively, or additionally, the system can include an analysis component that includes the at least one electrode, with the analysis component being configured to be reusable with the fluid storage component for any number of filtering components. For example, the filter can include a hollow-fiber filtration system, and the at least one electrode can include a co-planar combination electrode. In some such embodiments, at least one reagent of the one or more reagents can be deposited on the co-planar combination electrode.

In some other embodiments that include a filtering component and a fluid storage component, the filtering component can include the filter housing, the filter(s), and the electrode(s), and the fluid storage component can include the fluid storage chamber. The filtering component can be removably and replaceably coupled to the fluid storage component such that the fluid storage component can be reused by coupling a second filtering component that includes at least one filter to the fluid storage component.

One exemplary method of measuring fluid contamination includes passing a fluid sample that includes one or more cells (e.g., bacteria) into a filter. This action results in a number of occurrences, including: (1) the one or more cells contained within the fluid sample becoming concentrated within a region of the filter; (2) fluid from the fluid sample initiating a release of one or more reagents; (3) the one or more reagents reacting with the one or more cells to produce one or more redox species; and (4) the produced one or more redox species traveling to an analysis component that includes at least one electrode. The method further includes operating the at least one electrode to measure one or more electrochemical properties of the produced one or more redox species, the one or more measured electrochemical properties being indicative of an amount of fluid contamination.

The reagent(s) can be disposed in the filter such that fluid in the filter initiates the release of the reagent(s). For example, the reagent(s) can be embedded within one or more polymeric microcapsules disposed in the filter, with the polymeric microcapsule(s) being configured to dissolve when contacted by the fluid in the filter that initiates the release of the reagent(s). Alternatively, or additionally, the reagent(s) can be disposed on the at least one electrode such that fluid that passes through the filter initiates the release of the reagent(s) into the filter. The reagent(s) can include an enzyme substrate. In some such embodiments, the produced one or more redox species can include a cleaved substrate. Further, operating the electrode(s) to measure one or more electrochemical properties of the produced one or more redox species can include measuring an enzymatic activity of one of β-Galactosidase or β-Glucuronidase.

The method can further include introducing the reagent(s) at a location that is proximate to the filter. In some such embodiments, the reagent(s) can include a powder and/or a capsule.

The produced one or more redox species can include one or more signaling molecules. In some such embodiments, operating the electrode(s) to measure one or more electrochemical properties of the produced one or more redox species can include detecting indole and/or E. coli autoinducer 2 (AI-2). Operating the electrode(s) to measure one or more electrochemical properties of the produced one or more redox species can include performing amperometric detecting.

In some embodiments, the method can include detecting if the filter has been previously used for filtering a fluid sample. The detection can be based on, for example, an electrochemical output generated by one or more chemicals disposed in the filter. Such chemical(s) may or may not be akin to or otherwise associated with the one or more reagents.

The method can also include controlling a temperature of the produced one or more redox species. In some embodiments, the method can include incubating the reagent(s) and the one or more cells contained within the fluid within the filter to produce sufficient redox species for the one or more redox species to have the one or more electrochemical properties measured.

The action of passing a fluid sample that includes one or more cells into a filter can be carried out in a variety of manners. For example, it can include moving a plunger of a syringe away from the filter to draw the fluid sample into the filter. By way of further example, it can include moving a plunger of a syringe towards the filter to push the fluid sample into the filter.

The filter can be disposed in a filtering component of a contamination measuring system. In some such embodiments, the method can include disconnecting the filtering component from one or more other components of the contamination measuring system after a single use, disposing of the filtering component, and connecting a second filtering component having a filter disposed in it to the one or more other components of the contamination measuring system (e.g., a fluid storage component, an analysis component). In some other such embodiments, the method can include disconnecting the filtering component from one or more other components of the contamination measuring system after a single use, disposing of the filter, placing a second filter into the filtering component, and connecting the filtering component having the second filter disposed in it to the one or more other components of the contamination measuring system (e.g., a fluid storage component, an analysis component).

BRIEF DESCRIPTION OF DRAWINGS

This disclosure will be more fully understood from the following detailed description taken in conjunction with the accompanying drawings, in which.

DETAILED DESCRIPTION

Figure 1A:
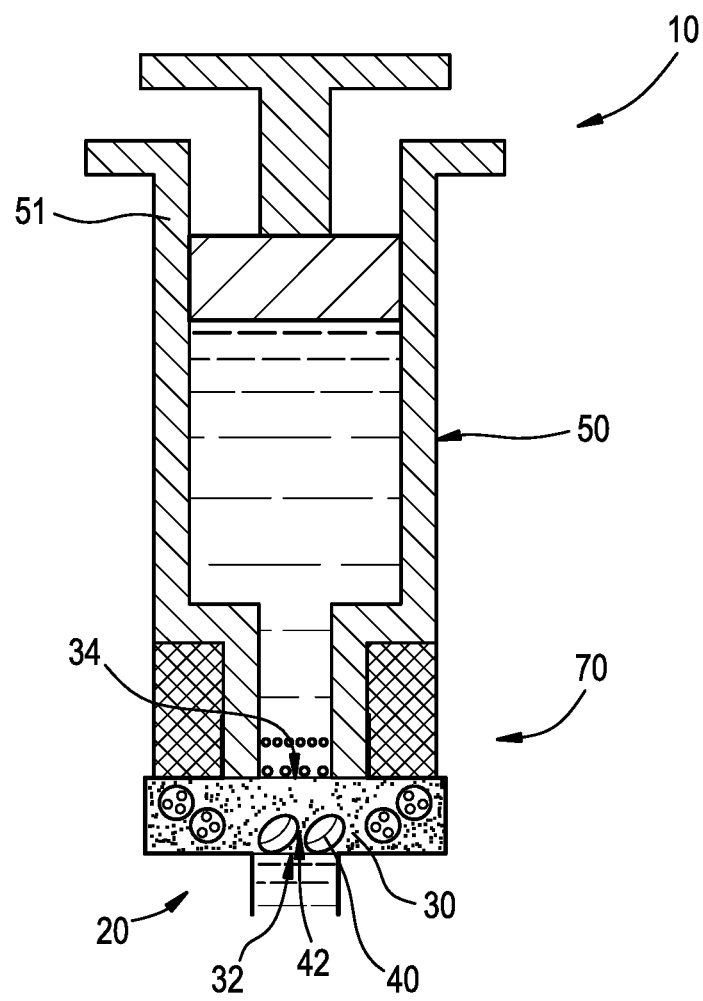
FIG. 1A is a cross-sectional side view of one exemplary embodiment of a device for sampling fluid.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In the present disclosure, like-numbered components of various embodiments generally have similar features when those components are of a similar nature and/or serve a similar purpose. Additionally, to the extent linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Accordingly, by way of example, to the extent components are described as having a diameter, a person skilled in the art will recognize how a width dimension can be equally appropriate. Sizes and shapes of the systems and devices, and components thereof, can depend at least on the sizes, shapes, and configurations of the other components of the systems and devices and an amount of fluid being analyzed, among other factors. Further, a number of different terms can be used interchangeably while still being understood by the skilled person. By way of non-limiting example, the terms "substances" and "materials" are generally used interchangeably to describe the particulates that enter and are eventually ejected from the filtering component into the fluid storage component. By way of further non-limiting example, the terms "particulates" and "contaminants" are generally used to describe the cells, bacteria, e.g., *E. coli*, and other foreign materials that reside in the fluid sample prior to filtering. By way of still further non-limiting example, the terms "cell" or "cells" are generally used to describe one or multiple bacterial, protozoal, fungal, or other species of microorganisms. Additionally, the present disclosure includes some illustrations and descriptions that include prototypes or bench models. A person skilled in the art will recognize how to rely upon the present disclosure to integrate the techniques, systems, devices, and methods provided for into a product in view of the present disclosures.

The present disclosure relates to systems, devices, and methods for point-of-use testing for fluid contamination, and more particularly relates to sampling fluid to measure electrochemical properties of one or more chemical species produced by particulates, such as bacteria and/or other foreign particles, located in the fluid, to measure the concentration of those particulates. Each of the advances provided for herein, by themselves, and in combination, allows for easy-to-use, inexpensive, and sanitary detection of contaminants in fluids. The present disclosure provides for rapid detection and measurement of quantitative electrochemical properties of cells and other pollutants in fluid samples.

An exemplary system can include a fluid storage component or chamber having a filtering component or chamber removably and replaceably attached thereto. The system can be configured to filter a fluid sample flowing therethrough to separate the cells and/or bacteria (sometimes collectively referred to as "cells") from the filtered fluid. The filtering component can be configured to capture and concentrate the cells within a filter(s) disposed within the filtering component, and the fluid sample can initiate a release of a reagent stored in the system (e.g., in a filter(s) of the filtering component, disposed on or adjacent to an electrode(s) of the system, among other locations described further below or otherwise derivable from the present disclosure) to cause the reagent to diffuse to the captured cells. The cells can interact with the reagent to produce a product of interest that can be used in a fluid sample analysis process. For example, an analysis component having one or more electrodes that can be associated with other component of the system (e.g., the fluid storage and filtering components) can detect the product of interest and measure electrochemical properties of the product of interest to detect the presence of contaminants (e.g., bacteria) in the fluid sample. After the sampling is completed, the filtering component can be detached and discarded, allowing the fluid storage component and/or the analysis component to be reused with another filtering component. Alternatively, portions of the filtering component, including the filter(s), can be cleaned and reused and/or portions or all of the fluid storage component and/or the analysis component can also be disposed of after one or more uses.

Figure 1B:
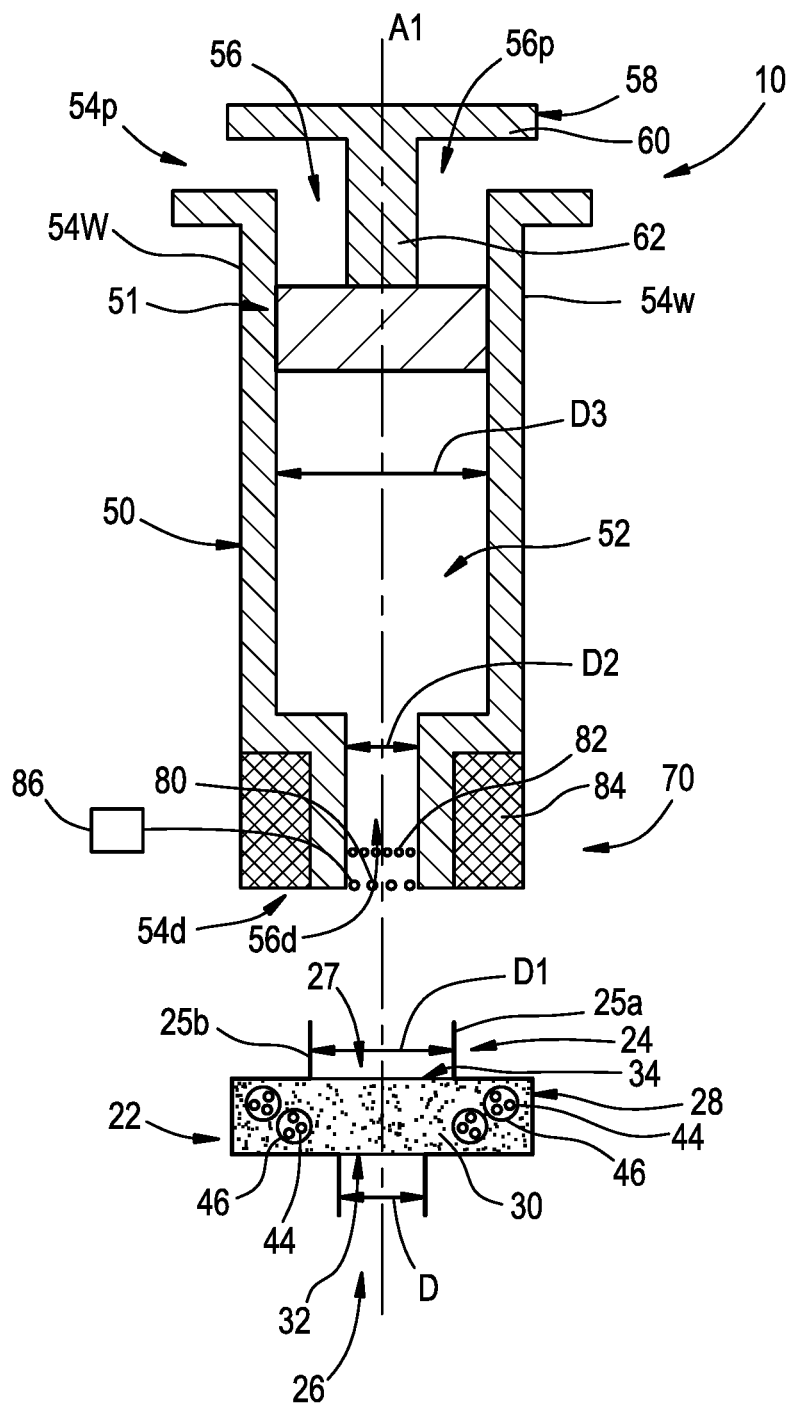
FIG. 1B is an exploded cross-sectional side view of the device of FIG. 1A.

FIGS. 1A and 1B illustrate an exemplary embodiment of a device 10 for use in conjunction with testing for fluid contamination. The illustrated device 10 includes a filtering component 20, a fluid storage component 50, and an analysis component 70. As will be understood in view of the present disclosures, various features of these three types of components (e.g., fluid entrances, filters, electrodes, etc.) can be interchanged between the three types of components, and further, not all of the three types of components are required to have an operational fluid sample analysis system. A person skilled in the art, in view of the present disclosures, will understand how the various features of the described filtering, fluid storage, and analysis components can be used in various embodiments either disclosed herein or otherwise derivable from the present disclosure.

Filtering Component

In the illustrated embodiment, the filtering component 20 includes a housing 22 having a filter 30 disposed in a receiving portion 28, a fluid entrance or inlet 26, and a fluid exit or outlet 27 that is part of a connecting portion 24. The filtering component 20 can be configured to receive a fluid sample such that it is passed into the filter, and in some instances it can be involved in the actual delivery of fluid sample. Upon receipt of the fluid sample, the filter 30 can be configured to separate and capture cells (e.g., bacteria) from the fluid sample.

The housing 22 can have many different sizes, shapes, and configuration, and generally it can be in the form of a single attachable unit. As shown in FIG. 1B, the housing 22 can include one or more openings, identified as a fluid entrance 26 and a fluid exit 27, to allow fluid and other materials to pass therethrough, as described further below. The housing 22 can be generally disc-shaped, which is the case in the present instance, though the shape of the housing 22 can vary, based, at least in part, on configurations of the components with which it is used, e.g., the size and shape of filter(s) disposed in the housing 22, the fluid entrance 26, the fluid exit 27, the fluid storage component 50, and/or the analysis component 70.

In some embodiments, the filtering component 20 can include the fluid entrance or inlet 26 as shown. The fluid entrance 26 can form an opening in the housing 22 through which fluid can be passed into a more central location in the housing 22 (e.g., the receiving portion 28). Although in the illustrated embodiment the fluid entrance 26 has its own channel or pathway formed at the entrance into the filtering component 20, in some embodiments the fluid entrance 26 can be one and the same with an entrance or inlet 32 of the filter 30, i.e., they share the same fluid path. That is, the inlet 32 of the filter 30 can also be the inlet 26 of the filtering component 20. In the illustrated embodiment, the fluid entrance 26 is proximate to the inlet 32 of the filter 30 such that fluid flows from the fluid entrance 26 and into the inlet 32 of the filter 30 for filtering. As described in greater detail below, in other embodiments a fluid entrance can be one and the same with the fluid exit (e.g., fluid exit 28) such that a fluid sample passes into a filter, and the fluid sample, or at least portions thereof (e.g., cells, bacteria, or portions of the sample that form a redox species, signaling molecules, etc.), passes back through the combined inlet and outlet using the same path or channel that was traveled to enter the filter.

The fluid entrance 26 can be configured to receive a fluid sample being passed to the filter 30 and/or deliver the fluid sample to the housing 22, and in turn the filter 30. Fluid can travel to the filter 30 in a variety of ways. In some embodiments, the fluid can be fed into the fluid storage component 50 by a syringe, via capillary action, via pumping, via gravity-driven flow, or by other techniques known by those skilled in the art for passing a fluid into and through a filter. In some embodiments, the fluid can be drawn in through the fluid entrance 26 by the analysis component 70, as described further below. A fluid introducer can be provided to introduce a fluid sample into the inlet of the filter housing (or directly into a filter inlet, as provided for herein, e.g., a filter inlet 32). Various exemplary fluid introducers include a pump and a syringe (a syringe being illustrated in FIGS. 1A, 1B, 2, 6A, 6B, and 6D), and also include chambers or containers that introduce fluid into the filtering component 20 by way of a gravity-driven flow. A person skilled in the art will recognize other types of fluid introducers that can be used to introduce fluid into the filtering component 20 without departing from the spirit of the present disclosure.

The housing 22 can also include a connecting portion 24 and a receiving portion 28. The connecting portion 24 can be configured to mate the housing 22 to other parts of the device 10, e.g. the fluid storage component 50 and/or the analysis component 70. As shown, the connecting portion 24 can be located on a side of the housing 22 closest to the fluid storage component 50, and includes the fluid exit or outlet 27 which is on an opposite side of the housing 22 from the fluid entrance or inlet 26. The filtering component 20 can be connected or otherwise coupled to the fluid storage component 50 using any number of coupling techniques known to those skilled in the art. For example, the connecting portion 24 can include one or more deflectable arms 25a, 25b. The arms 25a, 25b can extend substantially parallel to one another, though, in some embodiments, the arms 25a, 25b can extend at an oblique angle with respect to one another. A distance between the arms 25a, 25b can vary, based, at least in part, on configurations of the components with which it is used, e.g., the size and shape of the fluid storage component 50 and/or analysis component 70 in which it is disposed.

It will be appreciated that although two arms 25a, 25b are shown, the connecting portion 24 can include one, three, or four or more arms. By way of non-limiting examples, the filtering component 20 can be connected to the fluid storage component 50 via a snap-fit, or by way of a complementary male-female mating features. A person skilled in the art will recognize many other ways by which the two components can be coupled. In some embodiments, the connecting portion 24 can include hinges, hooks, or a textured surface in lieu of arms to attach to, or be received in, a corresponding feature of the device 10 (e.g., the fluid storage component 50). To assist in allowing at least one of the filtering component 20 and fluid storage component 50 to be reused, often the coupling mechanisms employed can allow for reuse of the filtering and/or fluid storage components.

The receiving portion 28 can be configured to retain or dispose one or more objects therein. More particularly, the receiving portion 28 is generally configured to include one or more filters (e.g., the filter 30) within that portion of the housing 22, as discussed in greater detail below. As shown, the receiving portion 28 is disposed between the inlet 26 and the outlet 27 such that it is more proximate to the fluid storage component 50 than the inlet 26 is to the fluid storage component 50, but less proximate to the fluid storage component 50 than the outlet 27 is to the fluid storage component 50. A person skilled in the art, in view of the present disclosures, will recognize the relative locations of the receiving and connecting portions, like the other components of the filtering component 20, can vary. The size of the receiving portion 28 can vary with the size of the objects disposed therein. As shown, a diameter D of the receiving portion 28 can be larger than a diameter D1 of the connecting portion 24, though in some embodiments the diameter D1 of the connecting portion 24 can be the same or greater than the diameter D of the receiving portion 28.

In the illustrated embodiment, the receiving portion 28 includes a filter 30 disposed within it. More generally, the present disclosure contemplates that one or more filters can be disposed within at least a portion of the receiving portion 28. As shown, the filter 30 can abut the ends of the receiving portion 28 to ensure that the fluid sample cannot flow between a sidewall of the receiving portion 28 and the filter 30 to circumvent filtration and to allow unfiltered materials to be ejected from the filtering portion 20. As shown, a geometry of the filter 30 can be disc shaped, though the filter can be circular, cylindrical, square, rectangular, and so forth. It will be appreciated that in some embodiments, the filter can be a brush filter or a sorbent filter.

The filter 30 can include the filter entrance or filter inlet 32, sometimes referred to as a first end of the filter 30, and a filter exit or filter outlet 34, sometimes referred to as a second end of the filter 30. As shown, the filter inlet 32 can be disposed on a side of the housing 22 further from the fluid storage component 50 than the filter outlet 34 is disposed with respect to the fluid storage component 50. In the illustrated embodiment the filter inlet 32 and the filter outlet 34 are located on opposed ends of the filter 30, though in some embodiments the filter inlet 32 and the filter outlet 34 can be located on the same end of the filter such that a fluid entrance into the filter (e.g., the filter entrance) can be one and the same with the fluid exit from the filter (e.g., the filter exit 34) such that a fluid sample passes into the filter, and the fluid sample, or at least portions thereof (e.g., cells, bacteria, or portions of the sample that form a redox species, signaling molecules, etc.), passes back through the combined fluid entrance and exit into the filter using the same path of travel that was traveled to enter the filter. Generally, the filter inlet 32 is configured to receive a fluid sample therein for filtering, and, after the fluid sample is filtered, remnants of the fluid sample (e.g., at least some of the fluid) that are not maintained in the filter for purposes described herein (e.g., cells or bacteria disposed in the fluid sample) can travel to the outlet 34, which is configured to eject the remnants of the fluid sample out of the filter 30 and filtering component 20. As described herein, even portions of the fluid sample that are maintained in the filter 30 for a period of time can be passed through the filter outlet 34, either in their retained form or in another form, such as in a form after interacting with one or more reagents, chemicals, etc.

The filter 30 (or filters, as contemplated herein) can be configured to separate and/or capture biological and/or non-biological contaminants from a sample. The filter 30 can be semipermeable to regulate a size of the particulates that are captured. For example, when a fluid sample is introduced into the filter 30, the filter 30 can allow fluid portions of the sample to pass therethrough, while capturing particulates such as cells 40, bacteria, e.g., *E. coli*, and the like.

The filter can include a mesh 36 having one or more pores 38 therein for capturing contaminants. A person having ordinary skill in the art will appreciate that the size, distribution, and location of the pores 38 in the filter 30 can determine the permeability of the filter. The pores 38 can be evenly distributed throughout the filter 30, as shown, or the pores 38 can be clustered in one or more locations along the filter 30 such that the filter 30 is semipermeable to allow filtered fluid to be ejected therefrom. The pores 38 can be evenly sized to allow homogeneity of the fluid sample that can pass therethrough, or, in some embodiments, the filter 30 can have pores of various sizes to regulate the particulate matter captured at various locations along the filter. Further, in some embodiments the filter 30 can have a variety of topological configurations, including any combination of one or more of the following elements: membrane(s); mesh(es); felt(s); fibrous plug(s); hollow fiber(s); packed bed(s) containing particles, fibers, or other materials; and/or brush(es).

The filter 30 can include one or more concentration regions 42 in which cells and other material(s) from the fluid sample are captured. Generally, and as shown in FIG. 1A, the concentration region 42 can be located proximate to the filter inlet 32, though, in some embodiments, the concentration region 42 can be displaced from the inlet 32, such as proximate to the filter outlet 34 for filter configurations where the majority of the particle capture occurs when the fluid first reaches the filter. A person skilled in the art, in view of the present disclosures, will recognize that the location and performance of one or more concentration regions can be a function of a variety of factors, such as the type of filter(s) being used. By way of non-limiting example, for a flat membrane or fibrous mesh, typically most of the cells (e.g., bacteria) will be captured near an inlet or entrance, whereas for a hollow-fiber configuration, typically most of the cells will be captured near an outlet or exit.

Adding additional volume of sample fluid into the filter 30 can cause an increased accumulation of cells in the concentration region 42. A person having ordinary skill in the art will understand that for detection of a redox species, the concentration of cells 40 within the filter 30 should reach a threshold concentration. At smaller concentrations, detection of electrochemical signals is less likely to take place as sufficient amounts of the products of interest are not made. Cell concentrations of one culture-forming unit (CFU) per 100 mL can be the threshold concentration at which detection can occur in cases where this is the desired limit of detection, as is the case in some drinking water applications, though, in some embodiments the threshold concentration can be approximately in the range of about 100 cells/ml of water to about 4000 cells/ml of water, as is the case for detection of *E. coli* and fecal coliforms in water used for non-drinking applications such as swimming, fish consumption, or agricultural irrigation.

It will be appreciated that for filters with two or more concentration regions 42, the concentration regions 42 can be located proximate to one another, though, in some embodiments the concentration regions 42 can be located on opposite ends of the filter 30, or in other desired locations within the filter. Additionally, each of the concentrations regions 42 (e.g., a first concentration range, a second concentration range, etc.) can be configured to receive a designed fraction of the fluid sample that enters the filter 30. Accordingly, as described in greater detail below, one or more electrodes of the analysis component 70 can measure a concentration of redox species produced by one or more cells in the fluid sample that is located in one or more of the concentration regions 42 (e.g., the first concentration region, the second concentration region, etc.) In some embodiments, the designed fraction of the fluid sample can be selected to include an expected number of cells (e.g., bacteria) in each of the concentration regions, such as zero cells or one cell for a sample concentration range of interest in the fluid sample. It will be appreciated by a person skilled in the art, in view of the present disclosures, that if the expected number of cells is zero cells or one cell in a concentration region, then the concentration of cells in the concentration region can be determined by measuring the presence or absence of redox species generated by the cells.

It will be appreciated that a volume of fluid sample passed through the filter 30 can be such that the amount of cells 40 in the fluid sample is sufficient to create a large number of cells per unit volume in the concentration region once the filtered fluid is ejected. As the fluid sample is filtered and the filtered fluid is ejected from the filter 30, the concentration of the cells 40 in the filter 30 increases.

The filter 30 can include one or more reagents 44 disposed therein. The reagents 44 can be dispersed throughout the filter 30 and/or embedded within the filter 30. The reagents 44 can be uniformly distributed throughout the filter 30 or confined at the sides of the filter 30, as shown.

The one or more reagents 44 can be introduced into the device in a variety of other configurations in addition to, or in lieu of, those discussed above. In some embodiments, the reagents 44 can be added to the system after cells 40 of the fluid sample have been captured. Addition of the reagents 44 after the cells 40 are captured allows the reagents 44 to be added directly to the concentration region 42, which can expedite its diffusion into the cells 40. In some embodiments, the reagents 44 can be incorporated in the filter 30 with a coating of polysaccharides (e.g., mannitol, erythritol, maltose monohydrate, or others). In some embodiments, the reagents 44 can be added into a test solution in the form of a powder or a capsule. In some embodiments, the reagents 44 can be deposited inside or on the surface of the analysis component 70, e.g., the electrode(s), as described further below.

In some embodiments, the one or more reagents 44 can include an enzyme substrate. Some non-limiting examples of reagents 44 can include Chlorophenol red-β-D-galactopyranoside (CPRG), and Isopropyl β-d-1-thiogalactopyranoside (IPTG), among others. A person skilled in the art, in view of the present disclosures, will understand other reagents 44 that can be used without departing from the spirit of the present disclosure. In some embodiments, the reagents 44 can include buffers and/or growth media formulated to nourish the cells of interest. The buffers and/or growth media can be configured to diffuse into the cells 40 to maintain their health and encourage division to increase concentration of the cells 40 within the filter 30. It will be appreciated that the filter 30 can have multiple reagents 44 embedded in the filter 30 simultaneously, as shown, or the filter 30 can have a single reagent 44 embedded therein.

The one or more reagents 44 can be stored in one or more microcapsules 46 that can be embedded within the filter 30. In some embodiments, the microcapsules 46 can be configured to reside within the pores 38 of the filter. The microcapsules 46 can be made from a polymeric material, such as poly(n-Butyl Acrylate), poly(lactide-co-glycolide)-b-poly(ethylene glycol) (PLGA-PEG), agarose, or alginate, or from other substances such as glycoproteins, polysaccharides (e.g., mannitol, erythritol, maltose monohydrate, or others), or naturally occurring gums such as gum arabic, among other materials. Polymeric encapsulation can preserve the reagents 44 and prevent dilution of the reagents 44 in the fluid sample. As shown, each microcapsule 46 can store one type of reagent 44, though, in some embodiments, a single microcapsule 46 can store two or more types of reagents 44.

The microcapsules 46 can be configured to dissolve when contacted by, or immersed in, a fluid, such as water. When the filter is dry, or when the fluid sample is first introduced, the microcapsules 46 store the one or more reagents 44 to prevent or limit diffusion of the reagents 44 through the filter 30. In this way, the microcapsules 46 can preserve the reagents 44 and/or the enzymatic substrate contained within the microcapsules 46 until the cells 40 reach the threshold concentration. Once the threshold concentration is reached, the microcapsules 46 can dissolve to allow the reagents 44 to be released into the fluid sample within the filter 30. In some embodiments, the material(s) used to microencapsulate the reagents 44 is configured to allow for the reagents to be released only after a specified amount of time has passed after the fluid sample contacts the microcapsules 46, i.e., after the material that encapsulates the reagents has been contacted by the fluid sample. By way of non-limiting example, the reagents 44 may not be released from the microcapsules 46 until at least five minutes have passed after the fluid sample contacts the microcapsules 46. A person skilled in the art will appreciate any amount of time can be the specified amount of time, such as thirty seconds, one minute, ten minutes, or longer (or shorter). Further, in some embodiments, the material(s) used to microencapsulate the reagents 44 is configured to allow for the reagents to be released only after a temperature of the material(s) reaches a threshold value. By way of non-limiting example, the reagents 44 may not be released from the microcapsules 46 until a temperature of about 40° C. is achieved. A person skilled in the art will appreciate the threshold value of the temperature can be many different temperatures, for example any temperature approximately in the range of about 20° C. to about 80° C. Moreover, in some embodiments the temperature-controlled release of the reagents can be determined, at least in part, by temperature-dependent solubility of the encapsulating materials, e.g., one or more polysaccharides such as mannitol, erythritol, maltose monohydrate, or others. The change in temperature can be achieved using a heating element or other temperature controller as provided for herein, by the temperature of the fluid sample, or by other means for changing a temperature known to those skilled in the art.

The one or more reagents 44 can disperse throughout the filter 30 and pass into the cells 40. One having ordinary skill in the art will understand that the reagents 44 can pass into the cells 40 by osmosis, absorption, diffusion, or another process known in the art. In some embodiments, the cells 40 can have a chemical affinity for a type of reagent, thereby selectively consuming reagents 44 based on their particular affinity.

Once the one or more reagents 44 enters the cells, the reagents 44 can have various effects on the cells 40, including induction of protein expression, permeabilization of cell membranes, nutrients to ensure normal cell function over the course of measurement, and buffers and ions to ensure consistent electrical responses to the presence of the redox species. The reagents 44 can be configured to stimulate cellular production of a chemical product of interest or a redox species 48. For example, IPTG can induce increased expression of the enzyme β-Galactosidase in coliform bacteria. Other reagents, such as saponins, Triton X-100, and B-PER™ Protein extraction reagent, can permeabilize cell membranes to release enzymes from within the cells or facilitate more rapid transport of substrates and redox species between the cells and the surrounding concentration region. In some embodiments, the β-Galactosidase in the cell can cleave an enzyme substrate to form the redox species 48. For example, CPRG can be cleaved to form Chlorophenol red (CPR). The redox species 48, such as CPR, can then diffuse out of the filter 30 to be detected electrochemically, as shown in FIGS. 3A-3B.

Figure 3A:
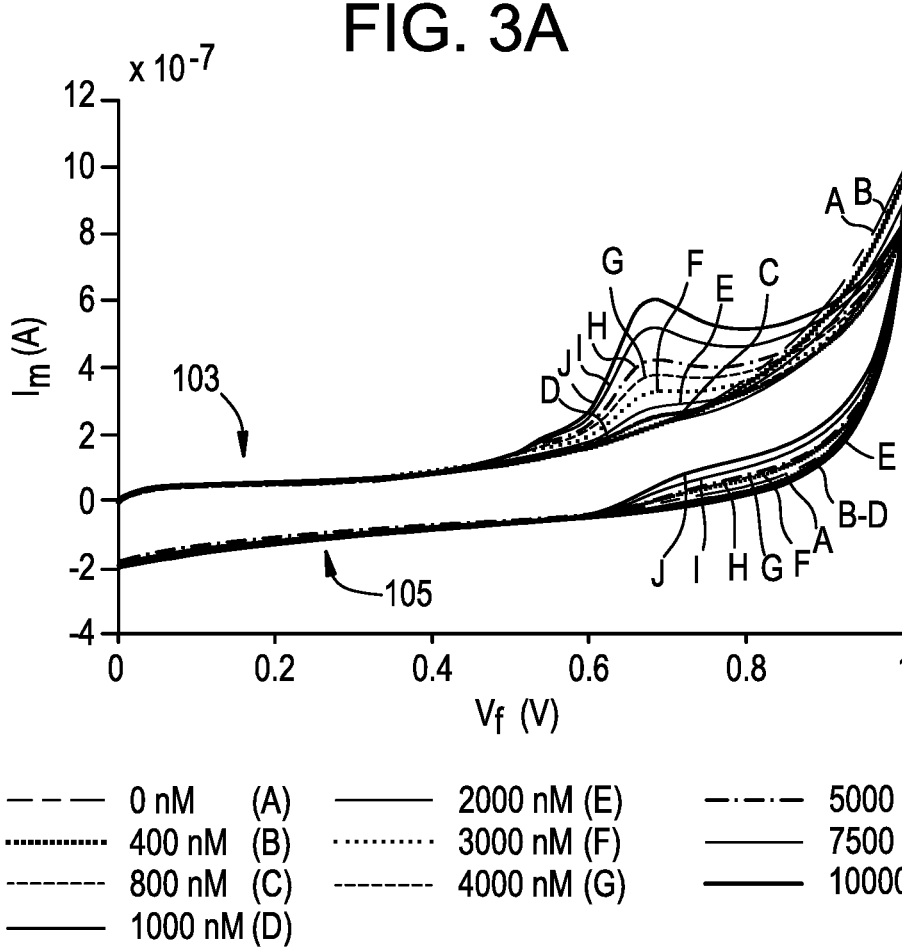
FIG. 3A is a graph illustrating cyclic voltammagrams of various concentrations of a redox species produced using devices for sampling fluid as provided for herein.
Figure 3B:
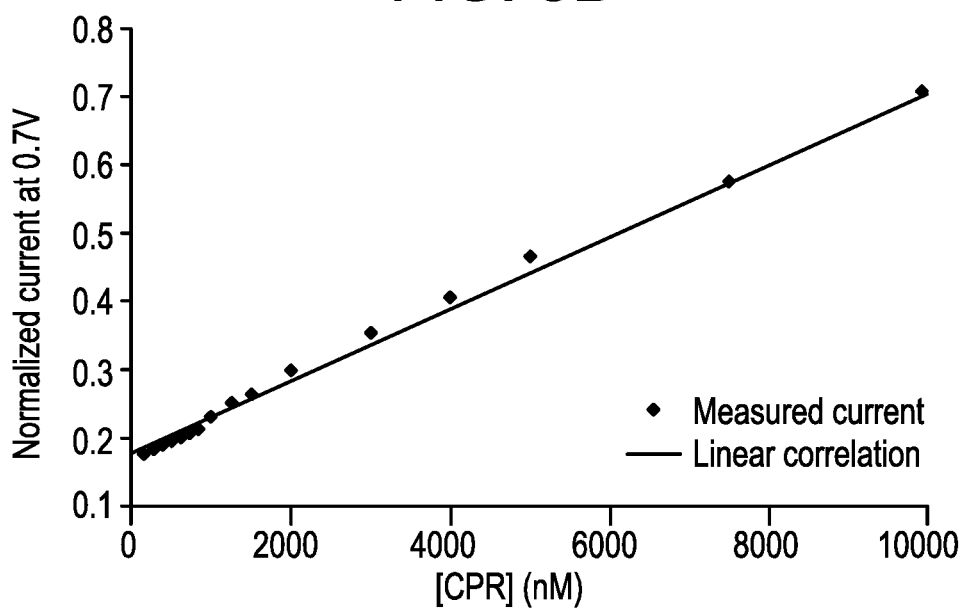
FIG. 3B is a graph illustrating a calibration curve for voltage values for various concentrations of the redox species produced using devices for sampling fluid as provided for herein.

More specifically, FIG. 3A illustrates cyclic voltammagrams of various concentrations of CPR in sodium phosphate (pH 7.2) at 45° C. as detected using a glassy carbon electrode functionalized with Copper(II) Phthalocyanine via dropping about 1 µL of saturated Copper(II) Phthalocyanine in pyridine on the glassy carbon electrode and allowing the pyridine to evaporate. The labeled concentrations of CPR include 0 nM (A), 400 nM (B), 800 nM (C), 1000 nM (D), 2000 nM (E), 3000 nM (F), 4000 nM (G), 5000 nM (H), 7500 nM (I), and 10,000 nM (J). The concentrations are shown in a first cluster 103 that is measured for increasing values of $V_f$, and a second cluster 105 that is measured for decreasing values of $V_f$ in view of the cyclic nature of the voltammagrams. As shown, cyclic voltammetry of CPR yields an oxidation peak at about 0.7 V, which increases in magnitude with increasing concentrations of CPR. FIG. 3B illustrates a calibration curve for CPR when normalized current $I_{norm}$ is the difference in current between the calibration voltage ($V_{cal}$=0.7 V) and the first reference voltage ($V_0$=0.4 V), divided by the difference in current between the second reference voltage ($V_1$=1 V) and the first reference voltage, i.e., $I_{norm}=[I(V_{cal})-I(V_0)]/[I(V_1)-I(V_0)]$. As shown, the normalized current $I_{norm}$ exhibits an approximately linear relationship with CPR concentration over an approximate concentration range of about 400 nM to about 10,000 nM (i.e. 10 µM), demonstrating that electrochemical methods such as cyclic voltammetry can be used for measurement of CPR concentration.

The concentration of cells 40 in the concentration region 42 should typically be such that the concentration of redox species 48 produced by the cells 40 can be detected by the analysis component 70. One having ordinary skill in the art will appreciate that a larger concentration of cells 40 can produce a larger concentration of the redox species 48. In general, as used within this application, redox species can include any molecule generated by the cells that is suitable for electrical detection, whether this detection is by a redox reaction (e.g. via amperometry or cyclic voltammetry), or by other mechanisms, such as altered impedance at electrode surface due to absorption or inclusion of the molecules. The redox species 48 can then be detected by the analysis component 70, as described further below, to measure the concentration of the cells that produced the redox species. If the redox species is created by one or more of the reagents, then at low concentrations of one or more of the reagents 48, the redox species 48 can be undetectable by the analysis component 70. For example, if CPRG is provided to the cells to generate CPR, then a CPRG concentration of at least about 0.25 mM and an *E. coli* cell concentration of about $4 \times 10^6$ cells/mL in the presence of an IPTG concentration of about 0.25 mM can produce a sufficient concentration of the redox species 48 to be detected by the analysis component 70.

Filters of various fluidic volumes can be used. For example, as shown in FIGS. 1A-1B, the filter 30 can retain approximately 1 mL of water for approximately every 100 mL sample introduced through the fluid entrance 26. The fluidic volume of the filter 30 can be understood as the volume of the fluid sample and accompanying particulates that can remain within the filter after the fluid sample is ejected. Generally, filters having a fluidic volume of less than or equal to about $\frac{1}{100}^{th}$ of the volume of the fluid sample can be used, though the fluidic volumes of the filters can vary. Some additional non-limiting examples of fluidic volumes of the filter can include about 0.5 mL, about 1 mL, about 1.5 mL, about 2 mL, and so forth. One having ordinary skill in the art will appreciate filters having smaller fluidic volumes allow chemical species such as reagents to more readily dissolve and diffuse through smaller volumes, which can increase the rate of the process.

A person having ordinary skill in the art will understand that surface tension can confine the cells 40 within the concentration region 42 of the filter 30. Diffusion of the one or more reagents 44 from the filter 30 can be controlled by the size of the reagents 44. As shown, a narrow width of the filter can ensure that little of the reagents 44 diffuse out of the filter 30. It will be appreciated that a timescale for leakage of a component by diffusion is given by (volume of concentrated solution*length of narrow conduit)/(cross sectional area of narrow conduit*diffusivity of molecule). A narrow filter 30 can maximize retention time of the reagents 44 within the filter 30 and decrease the volume of reagent diffusing out.

In some embodiments, the cells 40 can undergo incubation to enable production of the redox species 48. A person having ordinary skill in the art will appreciate that incubation times may vary based on the cells that are captured. In some embodiments, incubation times can range from zero to several hours or longer. For example, in the case of *E. coli*, incubation time can typically range from about 30 minutes to about 3 hours, although other times are possible, and the provided times are by no means limiting. Incubation can produce a sufficient amount of redox species 48 that can be detected by the analysis component 70. The incubation times afforded by the present disclosures are substantially faster than in existing systems, devices, and methods. Generating enough redox species in about 30 minutes to about 3 hours to test results in a contamination analysis one skilled in the art would consider to be immediate or near immediate in comparison to existing technology, which can take at least 18 to 24 hours to incubate. The amount of time it takes to perform the analysis after enough redox species is present is negligible, such as in a manner of seconds or minutes.

It will be appreciated that the filtering component 20, including the housing 22 and the filter 30, can be disposable. In some embodiments, the microcapsules 46 can include an additional electroactive component (not shown). The additional electroactive component can be embedded in the microcapsule 46 along with the one or more reagents 44, or in separate microcapsules. Some non-limiting examples of the additional electroactive component are ascorbic acid and guanine. Additionally, in some embodiments of the device, a known amount of the redox species (e.g., Chlorophenol red) can be encapsulated so as to be released before the concentrated cells generate a measurable amount of the redox species, thus serving as an initial spiked concentration of the redox species which the device could use for an initial calibration before measuring the redox species generated by the concentrated cells. Detection of the additional electroactive component can suggest that the filter 30 had not been previously exposed to a fluid sample since the microcapsules 46 that store the additional electroactive component have not yet been dissolved. In this manner, the presence of the electroactive component can prevent reuse of the filter 30. Reuse of filters or use of dirty filters can cause erroneous measurements during testing, which can hamper data sampling. A person skilled in the art, in view of the present disclosure, will recognize other chemicals and the like that can be incorporated into the filter to help determine if the filter has been previously used.

In some embodiments, the housing 22 can be reusable while the filter 30 is discarded. After the fluid sample is filtered, the filter 30 can be removed and the housing 22 can be washed to get rid of foreign particulates. A new filter can then be inserted and a new fluid sample can be passed through the fluid entrance. One having ordinary skill in the art will understand that in some embodiments, the filtering component 20, including the filter 30, can be reusable. In such embodiments, the filter 30 and the housing 22 can be thoroughly cleaned to remove foreign particulates prior to passing a new fluid sample therethrough.

Fluid Storage Component

The fluid storage component 50 can include a chamber 52 for storing fluid for depositing into the filtering component 20 and/or receiving filtered fluid ejected from the filtering component 20. The chamber 52, which can be defined by a housing 51, can be any one of a syringe, cup, bowl, pump, or another vessel that can store fluid therein. As shown, the chamber 52 can include a first end 54*d*, a second end 54*p*, and first and second sidewalls 54*w* that define a channel or lumen 56 therebetween. The channel 56 can extend along a central axis A1 that runs between a first and second end 56*d*, 56*p* of the channel 56.

The fluid storage component 50 can be in fluid communication with the filtering component 20 such that the chamber 52 is in fluid communication with the filter(s) 30. Fluid communication means that a fluid can be effectively moved from one location to the other. The channel 56 can be in fluid communication with the housing 22 of the filtering component 20 such that fluid ejected from the filter 30 passes into the channel 56 and/or fluid from the chamber 52 can be passed through the channel 56, into the housing 22, and into the filter 30. Fluid passing between the filter 30 and the channel 56 can pass between the filter outlet 34, the fluid exit 27 of the connecting portion 24, and the first end 56*d* of the channel. The connecting portion 24 can be received, or in fluid communication with, the first end 56*d* of the channel 56 to allow the fluid to travel from the fluid entrance 26 and into the first end 56*d*. The connecting portion 24 can abut an outer surface of the chamber 52, as shown, to attach to the fluid storage component 50, though, in some embodiments, the connecting portion 24 can abut an inner surface of the chamber 52 to be coupled to the fluid storage component 50, or can be otherwise coupled to the fluid storage component 50 as described above or as otherwise known to those skilled in the art.

As discussed above, a variety of different fluid introducers can be used to advance a fluid sample into the filtering component 20. As shown in the illustrated embodiment, the fluid introducer includes a syringe having the chamber 52 and a plunger 58 for regulating fluid flow through the fluid storage component 50. The plunger 58 can be inserted through the second end 56*p* and configured to translate towards and away from the filtering component 20 that is associated with the first end 56*d* of the channel 56 to draw the fluid into the channel 56. The plunger 58 can include a handle 60 and a base 62 that abuts the first and second sidewalls 54*w* of the chamber 52. The handle 60 can have a variety of shapes to facilitate grasping and translation of the plunger 58. The base 62 can be disc shaped, as shown, though, the base 62 can be rectangular, round, cylindrical, triangular, and so forth. One having ordinary skill in the art will appreciate that the base 62 can be shaped to correspond to the shape of the chamber 52 such that the base 62 abuts the sidewalls 54*w* of the chamber 52 to seal contents between the base 62 and the first end of the channel 56*d*. Such a seal can prevent air and/or fluid from traveling between the base 62 and the sidewalls 54*w*. Translation of the plunger 58 within the channel 56 towards the filtering component 20 can eject fluid from the channel 56, which can be utilized, for example, when the fluid exit 27 doubles as the fluid entrance. Translation of the plunger 58 within the channel 56 away from the filtering component 20 can draw the fluid into the channel 56, as shown, from the fluid entrance 26, through the filter 30, through the fluid exit 27, and into channel 56.

A person having ordinary skill in the art will understand that translation of the plunger 58 can also regulate an intake volume of the chamber 52. The intake volume of the chamber 52 can be varied by translation of the plunger 58 towards and away from the filtering portion 20. For example, translation of the plunger 58 away from the filtering portion 20 can increase the intake volume of the chamber 52 while translation of the plunger 58 towards the filtering portion 20 can decrease the intake volume of the chamber 52. The maximum intake volume of the chamber 52 can vary. In some embodiments, the chamber 52 can have a maximum intake volume of more than 25 mL, more than 50 mL, more than 75 mL, more than 100 mL, more than 150 mL, more than 200 mL and so forth.

In the illustrated embodiment, the plunger 58 can create a natural barrier that can confine the filtered fluid to the filtering portion 20 and prevent it from entering the fluid storage component 50. For example, if a fluid is pushed through the fluid entrance 26 rather than drawn, the plunger 58 can prevent the fluid from entering the chamber 52. This allows the user to control the timing of when fluid sampling occurs. When ready, the plunger 58 can be translated away from the filtering component 20 to draw fluid through the fluid entrance 26 and into the filter 30. After filtering, the filtered fluid can be ejected from the filter outlet 34 and the filtered fluid can travel into the channel 56, all by drawing the plunger away from the filtering component 20.

The first and second ends 56*d*, 56*p* of the channel can have different diameters. As shown, the first end 56*d* can have a diameter D2 and the second end 56*p* can have a diameter D3. In some embodiments, the diameter D2 of the first end 56*d* can be smaller than the diameter D3 of the second end 56*p*, though, in some embodiments, the two diameters can be equal or the diameter D2 of the first end 56*d* can be greater than the diameter D3 of the second end 56*p*.

The first end 56d can limit the transport of cells 40 and other materials by confining the enzymatic products, and reagent(s) 44 received therein, proximate to the first end 56d of the chamber 56. Confinement can also be obtained when the filtered fluid is separated from the concentration region 42 by a narrow connection. As shown, the smaller diameter D2 of the first end can concentrate the one or more reagents 44 and the redox species 48 near the analysis component 70 to measure electrochemical properties of materials passing therethrough. Small molecules and ions, such as the redox species 48, typically experience slower diffusion rates. A person having ordinary skill in the art will understand that small molecules and ions have typical diffusivities approximately in the range of about $10^{-9}$ m$^2$/s to about $10^{-10}$ m$^2$/s, and the length scale of confinement in the absence of flow, e.g., once concentration of cells is completed, can be calculated by (Diffusivity*time)$^{0.5}$.

Other mechanisms can be used for confinement in conjunction with the first end 56d of the channel 56. In some embodiments, the chamber 56 can include one way check valves (not shown, but see description and figures related to the embodiment of FIGS. 6A-6E) that permit fluid flow in a single direction. The fluid sample can travel from the filter outlet 34 and into the fluid storage component 50, but filtered fluid cannot recede back into the filter 30. In some embodiments, the fluid storage component 50 can be separated from the filter 30 to confine the concentrated cells 40 and prevent dilution of the cells 40.

Analysis Component

The analysis component 70 can be associated with either or both of the filtering component 20 and the fluid storage component 50 to measure electrochemical properties of cells 40 from a fluid sample captured by the filter 30. The analysis component 70 can include one or more electrodes 80, 82 attached to a reader 86 that is configured to detect electrochemical properties produced by the cells 40 concentrated in the filter 30. Other components, such as a temperature controller (e.g., heating element), can also be incorporated into the analysis component and/or into the filtering component 20 and/or the fluid storage component 50. In some embodiments, the analysis component 70 includes any components of the system that include an electrical connection, thereby keeping the electrical connections associated with a single component of the system. This can make it easier to make certain portions reusable and/or otherwise be maintained. As shown, portions of the analysis component 70, e.g., the electrodes 80, 82, are in fluid communication with the filtering component 20, and thus the filter(s) 30.

The one or more electrodes 80, 82 of the analysis component 70 can include a working electrode 80 and a reference electrode 82. The electrodes 80, 82 can be positioned at the first end 56d of the channel 56 proximate to the filtering component 20, as shown each being disposed in a first half of the channel 56, though it will be appreciated that the electrodes 80, 82 can be positioned in various locations along the channel 56 or otherwise in conjunction with the fluid storage component 50. The working electrode 80 can be disposed closest to the filtering component 20, as shown, though in some embodiments the working electrode 80 can be disposed further from the filtering component 20 than the reference electrode 82, or approximately in-line with reference electrode 82. The electrodes 80, 82 can communicate detection information to the remainder of the analysis component 70, e.g., a reader 86. It will be appreciated that in some embodiments the electrodes can be a part of the fluid storage component 50, attached to the housing 22, or connected externally to the reader 86. A person having ordinary skill in the art will appreciate that in some embodiments, the one or more electrodes 80, 82 can also include a counter electrode (not shown, but see description and figures related to the embodiment of FIGS. 6A-6E).

The working electrode 80 can contact the materials (e.g., the redox species) ejected from the filter 30 to measure electrochemical properties of the materials. A fixed potential difference can be applied between the working electrode 80 and the reference electrode 82 to drive the electrochemical reaction on the surface of the working electrode 80. The current that results from this electrochemical reaction can be measured with respect to the reference electrode 82. When the particulates ejected from the filter flow past the working electrode 80, the working electrode 80 can measure the reaction that occurs thereon.

A person having ordinary skill in the art will understand that the working electrode 80 can be made of an inert metal such as gold, silver, or platinum, an inert carbon such a glassy carbon, pyrolytic carbon, or porous graphite, or mercury. In some embodiments, an ultramicroelectrode (UME), a rotating disk electrode (RDE), a rotating ring-disk electrode (RRDE), a hanging mercury drop electrode (HMDE), or a dropping mercury electrode (DME) can be used. In some embodiments, the electrodes 80, 82 can be functionalized with Copper(II) Phthalocyanine.

The electrodes 80, 82 can be configured to measure various electrochemical properties of the redox species 48 ejected from the filter 30. For example, the electrodes 80, 82 can measure an enzymatic activity of one of β-Galactosidase or β-Glucuronidase. In some embodiments, the electrodes 80, 82 can detect signaling molecules produced by the concentrated cells. By way of example, the electrodes 80, 82 can detect signaling molecules such as indole and *E. coli* autoinducer 2 (AI-2) produced by the concentrated cells. A person having ordinary skill in the art will appreciate that signaling molecules such as indole can be adsorbed onto molecularly imprinted polymers (MIPs) fabricated to be specific to the signaling molecule of interest, so that the adsorbed signaling molecules can be electrically detected as a change in impedance of a MIP layer adhered to an electrode.

The redox species 48 can then be detected using electrochemical analysis processes known to those skilled in the art, e.g., amperometric detection, cyclic voltammetry, electrochemical impedance spectroscopy, and/or differential pulse voltammetry. A person skilled in the art will understand that a sufficient concentration of one or more reagents 44 is an amount of species that can produce a concentration of redox species that can be detected by the analysis component 70. By way of example, a sufficient concentration of the reagent CPRG can be approximately in the range of about 0.25 mM for detecting *E. coli* concentrations of approximately 4×10$^6$ cells/mL in the presence of about 0.25 mM of the inducer IPTG, whereas higher concentrations of CPRG may be necessary for detecting *E. coli* at lower concentrations. In some embodiments, the analysis component can periodically perform the electrochemical detection to check for presence of the redox species and the incubation time can be determined dynamically based on the results of the electrochemical readout. For high levels of cell concentration, the sufficient concentration of the redox species 48 can be obtained sooner than for lower levels of cell concentration. High concentrations can thus reduce incubation time and speed up the fluid sampling process.

The electrodes 80, 82 can serve as a heating element for the contents of the filter 30, and/or the analysis component 70 can include a separate heating element 84. More generally, the heating element can be a temperature controller or temperature control element, thus allowing the analysis component 70 to regulate a temperature by heating or cooling as desired, and thus reference herein to a heating element is by no means limiting to only allowing for heating. The heating element 84 can be positioned adjacent to the fluid storage component 50, the filtering component 20, or both. As shown, the heating element 84 can be positioned proximate to a first end 54*d* of the chamber 52, including the channel 56, the fluid exit 27, and the filter output 34 such that it is adjacent to the concentration region(s) 42. In some embodiments, the heating element 84 can be positioned proximate to the filter inlet 32, within the concentration region(s) 42 of the filter 30, within the channel 56 of the fluid storage component 50, and so forth. It will be appreciated that in some embodiments one or more of the electrodes 80, 82 and the heating element 84 can both be used to heat the contents of the filter 30.

The heating element 84 can be configured to regulate the temperature of the device 10 or maintain contents of the device 10 at a desired constant temperature, or within a range of desired temperatures. Specifically, the heating element 84 can maintain the filter 30 at a desired temperature such that the cells 40 collected in the concentration region(s) 42 can be maintained at a temperature shown to improve selectivity for desired strains. For example, as known to a person having ordinary skill in the art, *E. coli* cells can exhibit greater β-Galactosidase activity at temperatures of about 44.5° C. than other bacterial strains that exhibit β-Galactosidase activity, with the use of this temperature as a desired constant temperature being a means of ensuring greater selectivity for detection of *E. coli*. Other cell strains and/or species may necessitate measurement at a different temperature, such as about 37° C.

In some embodiments, the heating element 84 can also regulate the temperature so as to decrease production of materials that can interfere with detection of the redox species 48 and the signaling molecules, e.g., products produced by other materials of the fluid sample. In some embodiments, the heating element 84 can set a temperature beyond the optimal temperature for detection to denature any active enzymes and facilitate reuse of the electrodes 80, 82 while minimizing interfering signals from previous measurements. It will be appreciated that additional methods for concentrating the cells can be used in combination with, and in lieu of, the heating element 84 to maintain the cells at the desired temperature, such as filtration, use of magnetic particles that bind specifically to cells with a desired selectivity, immunocapture, acoustophoresis, electrophoresis, dielectrophoresis, centrifugation, and so forth.

The analysis component 70 can also include a reader 86. The reader 86 can be attached externally to the system, or can be removably coupled to one or more of the filtering component 20 (e.g., via the housing 22), the fluid storage component 50 (e.g., via the chamber 52), and/or the analysis component 70 (e.g., via the electrodes 80, 82). A person skilled in the art will appreciate that the reader 86 can include a power supply, a display, a data interface, electronic circuitry for performing electrochemical measurement, electronic circuitry for controlling temperature, and any other features that output results of detection of the electrochemical properties of the device. The reader 86 can typically be reusable, although nothing about it prevents it from being discarded after use.

The reader 86 can be configured to display the electrochemical properties of the redox species 48 and/or the signaling molecules detected by the electrodes 80, 82. It will be appreciated that in some embodiments the reader 86 can communicate with the remainder of the system, or other remote devices (e.g., computers, mobile devices, smartphones, etc.) by wireless communication. For example, the reader can include a data communication link with the electrodes 80, 82, and subsequently communicate data related to one or more of the electrochemical properties that are measured by the electrodes (e.g., measured properties and/or other information derivable from the measured properties). In some instances, more generally a display can be provided that has a data communication link with the electrodes 80, 82, the display being configured to display data related to one or more of the electrochemical properties that are measured by the electrodes (e.g., measured properties and/or other information derivable from the measured properties).

Alternative Embodiments

Figure 2:
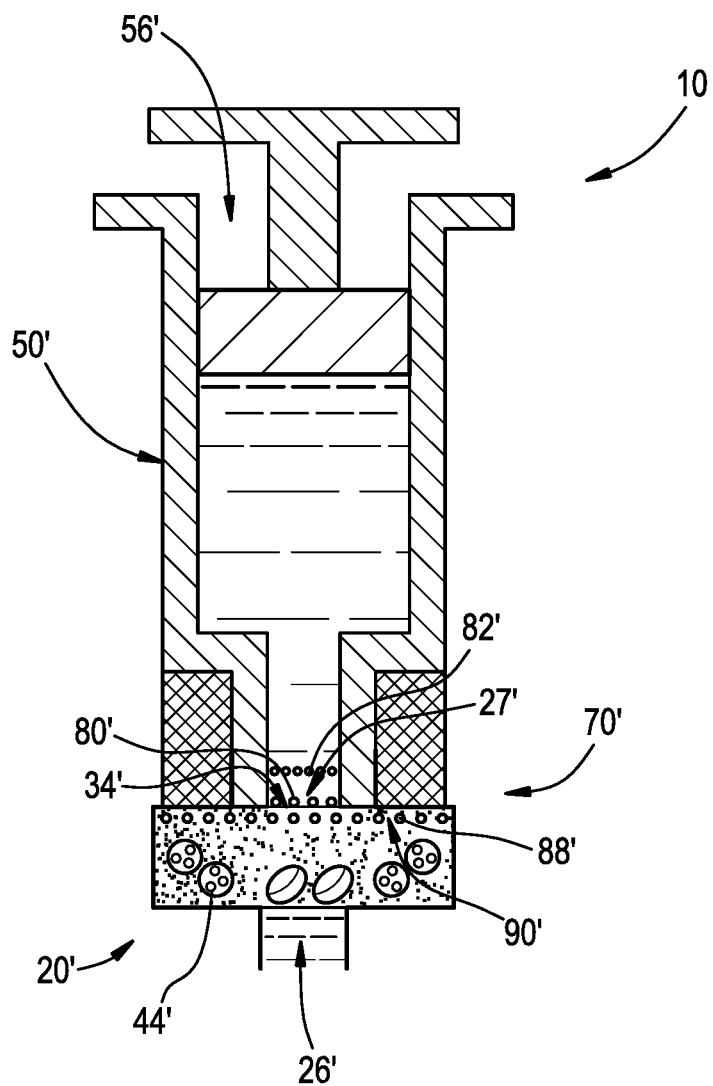
FIG. 2 is a cross-sectional side view of another exemplary embodiment of a device for sampling fluid, the device including a membrane.

FIG. 2 illustrates an alternative embodiment of the device 10' that includes a membrane or porous material 88' to regulate the materials ejected from the filter 30'. In some embodiments, the membrane 88' can be a coating. The membrane 88' or coating can be located in a number of different locations, including but not limited to: disposed on one or more electrodes of the electrodes 80', 82', and/or disposed between one or more electrodes of the electrodes 80', 82' and at least one of an inlet 26', an outlet 27', and the at least one filter 30'. As shown, the membrane 88' can be disposed between the filter outlet 34' and the electrodes 80', 82', though in some embodiments the membrane 88' can be disposed within the channel 56' of the fluid storage component 50', or on, or in between, the electrodes 80', 82'. In some embodiments, the membrane 88' can be a separate structure that can be placed between the filtering component 20' and the fluid storage component 50'. In some embodiments, the membrane 88' can be affixed to the one or more electrodes 80', 82' to ensure that the electrode(s) does not contact or detect electrochemical properties of undesired cells.

The membrane 88' can be semipermeable to the one or more reagents 44' and/or the redox species produced to allow diffusion of the reagents 44' and/or the redox species therethrough. The membrane 88' can be configured to limit the passage of the reagents 44', the redox species, and other particulates in the fluid sample on the basis of size, charge, and/or other properties, electrochemical or otherwise. The membrane 88' can include pores 90' that can be configured to trap particulates ejected from the filter outlet 34' prior to entering the channel 56'. It will be appreciated that the membrane 88' can be disposable along with the filtering component 20', or used and replaced after several tests. It will also be appreciated that multiple membranes 88' can be staggered to further regulate the materials ejected from the filtering component 20' into the fluid storage component 50'. The membranes 88' can be located in one of, or both of, the filtering component 20' and the fluid storage component 50'.

An alternative embodiment of the device 10 can include gravity filtration of the fluid sample. That is, rather than drawing the fluid sample in through the filtering component 20 and storing the filtered fluid in the fluid storage component 50, the fluid sample can be introduced into the fluid storage component 50 and "pushed" into the filtering component 20 to capture the cells 40. The fluid sample can be loaded into the fluid storage component 50, e.g., a syringe, such that the fluid sample is confined within the fluid storage component 50. The plunger 58 can be pushed to inject the fluid into the filtering component 20. Once the sample fluid enters the filter inlet (which is the filter outlet 34 in the illustrated embodiment of FIGS. 1A and 1B), filtration can occur by gravity and the filter outlet (which is the filter inlet 32 in the illustrated embodiment of FIGS. 1A and 1B) can eject the filtered fluid out of the device 10. It will be appreciated that in a gravity filtration system, the electrodes 80, 82 can be disposed proximate to the filter outlet (again, as shown the filter inlet 32), on a side of the filter 30 that is furthest from the fluid storage component 50.

In another potential geometry of the device 10, the cells 40 can be concentrated in multiple concentration regions 42. The concentration regions 42 can be a set of chambers or vessels where the volume of the cells 40 in each chamber is varied, as can be achieved, for example, by modulating the hydraulic resistance of a path leading up to each chamber. The set of chambers in which the cells are detected can be used to calculate a Most Probably Number (MPN) of cells in the initial sample. A person skilled in the art, in view of the present disclosures, will understand that the MPN is a statistical estimate that can quantify cells and/or bacteria via addition of a range of sample volumes to a set of culture tubes. The MPN can also be implemented in a compartment bag test, as known to those skilled in the art, where a fluid sample is divided among compartments in a flexible bag with a range of volumes for culture with an enzyme substrate or other reagent, with the result that a range of independent sample volumes is analyzed for the presence or absence of cells and/or bacteria in each compartment.

In some embodiments, fluid samples can be filtered through filter plates (sometimes referred to as filtration plates) and filter plate wells can then be placed in contact with a corresponding array of electrodes to facilitate quantitation by electrochemical measurement of how many wells had cells present in them. It will be appreciated that commercially available 96-well filter plates have been used to culture multiple bacterial colonies in each well, and the separation of samples into small volumes has facilitated sensitive detection of DNA sequences via digital PCR and femtomolar detection of serum proteins via digital ELISA.

Test Data

Figure 4A:
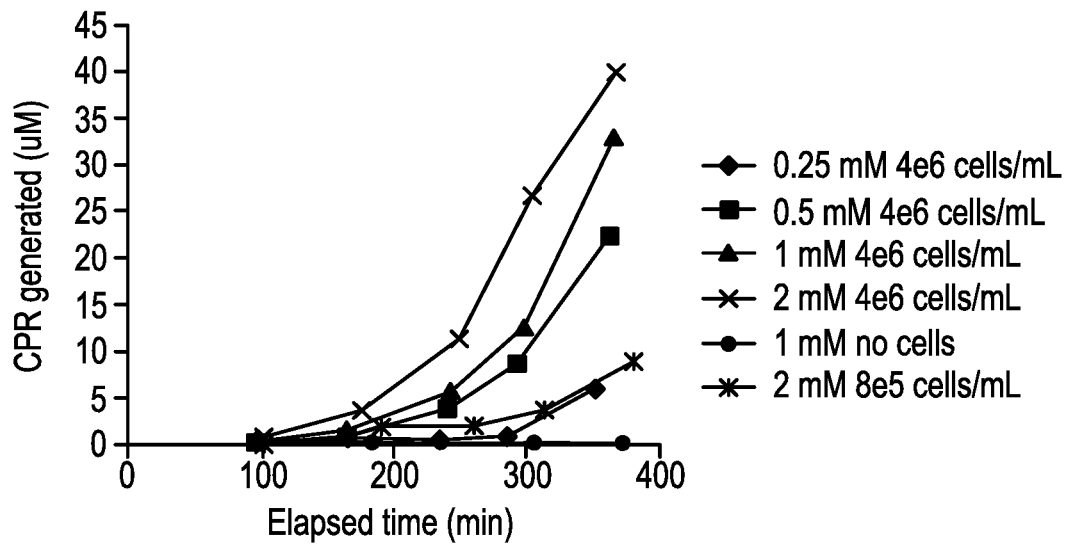
FIG. 4A is a graph illustrating a concentration of redox species produced over time using devices for sampling fluid as provided for herein for various concentrations of cells.
Figure 4B:
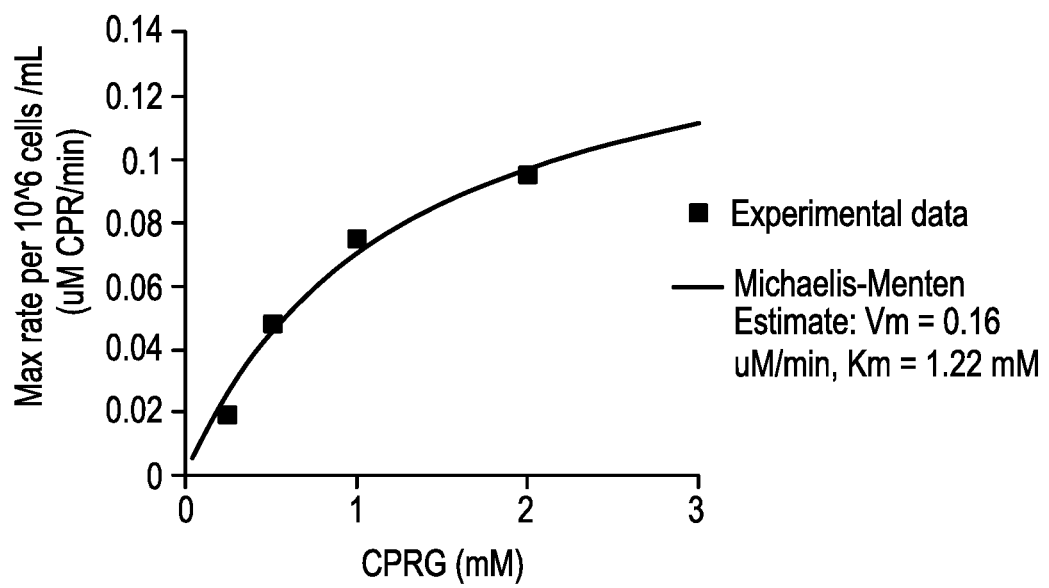
FIG. 4B is a graph illustrating a maximum rate of measured redox species production, normalized by sample cell concentration, as a function of reagent concentration, the redox species being produced by devices for sampling fluid as provided for herein.

FIGS. 4A-4B illustrate test data for redox species production in response to various reagents and cell concentrations in accordance with the present disclosures. FIG. 4A illustrates test results of a quantity of the redox species, e.g., CPR, produced over time by intact $E.$ $coli$ MG1655 cells at about 44.5° C. suspended in about 0.1 M sodium phosphate (pH=7.2) in the presence of about 0.25 mM IPTG and CPRG concentrations approximately in the range of about 0.25 mM to about 2 mM. As shown in FIG. 4A, the amount of the redox species 48 produced can vary over time based on the reagents and cell concentration. It will be appreciated that higher cell concentrations, e.g., about $4 \times 10^6$ cells/ml, as shown in FIG. 4A, can generate larger amounts of the redox species in a given amount of time than lower cell concentrations.

Periodic measurement of the amount of the redox species present over the course of filtration can be used to determine a rate of production of the redox species. FIG. 4B illustrates a maximum rate of the measured redox species production normalized by cell concentration as a function of reagent concentration. In calculating the rate of production, an initial CPR measurement can first be taken prior to introduction of the fluid sample to determine reagent cleavage during storage within the filter. This measurement can serve as a quantification of background CPR production prior to fluid sampling. Subsequent measurements can be taken at periodic intervals during diffusion of the reagents throughout the filter 30 and into the cells to determine the rate at which the redox species (e.g., CPR) is produced. A person skilled in the art will appreciate that a maximum production of the redox species for a given reagent concentration can be determined via Michaelis-Menten kinetics when the maximum possible rate of substrate cleavage is known, as well as the substrate concentration yielding half of the maximum possible rate of substrate cleavage. FIG. 4B illustrates a maximum rate of measured CPR production, normalized by sample cell concentration, as a function of CPRG concentration. Experimental data was used to estimate Michaelis-Menten kinetic parameters for $V_m$, the maximum possible rate of CPR production, and $K_m$, the CPRG concentration yielding half of the maximum possible CPR production rate. As shown, an analysis of the experimental enzyme kinetic data in FIGS. 4A-4B yields an estimate that the maximum possible rate of CPR production by an $E.$ $coli$ concentration of about one cell per mL at about 44.5° C. is about 160 fM/min (i.e., about $160*10^{-15}$ moles of CPR per liter per min). According to this measurement, if $E.$ $coli$ cells in the concentration region after filtration have a concentration of about $10^5$ cells/mL, then the maximum possible rate of CPR production will be about 16 nM/min, yielding about 960 nM CPR generated in 60 min, which is well within the range of CPR measurable via cyclic voltammetry as shown in FIG. 3B. These results inform, for example, the rational design of the filter, filter housing, and measurement protocol for measurement of $E.$ $coli$ concentration.

Methods of Use

FIGS. 5A-5E illustrate one method of using the device 10 of FIGS. 1A-1B for concentrating cells 40 and detecting electrochemical properties of the redox species 48 in a fluid sample. Except as indicated below, and will be readily appreciated by one skilled in the art, the steps of the described method can be performed with various configurations of the devices discussed herein or otherwise derivable in view of the present disclosures, and one or more features of the device discussed above can be omitted or added without departing from the spirit of the present disclosure.

Figure 5A:
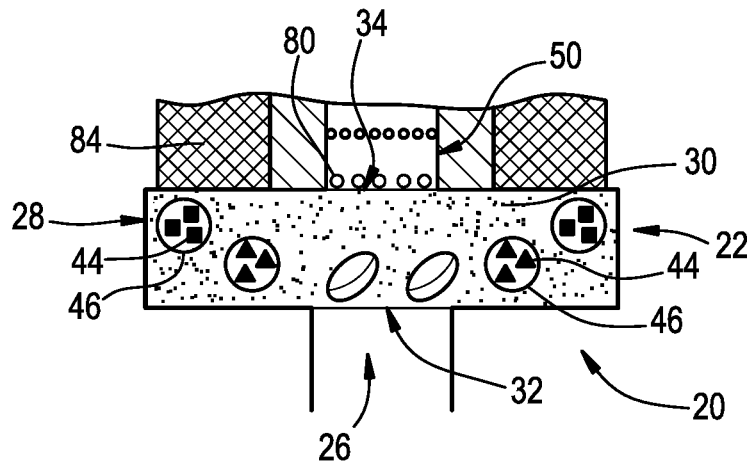
FIG. 5A is a detailed cross-sectional side view of a filtering component of the device of FIG. 1A, the filtering component including a filter having a plurality of microencapsulated reagents disposed therein.

FIG. 5A shows the filtering component 20 prior to introduction of a fluid sample through the fluid entrance 26. As shown, the reagents 44 stored in the microcapsules 46 embedded within the filter 30 are concentrated at a periphery of the filter 30, though, as described above, the microcapsules 46 can be dispersed in virtually any desired location throughout the filter 30, such as having the microcapsules 46 embedded closer to the filter outlet 34. One skilled in the art will appreciate that the filter 30 can typically be dry before use to keep the reagents 44 stored in the microcapsules 46 and prevent the microcapsules 46 from dissolving. In some embodiments, a blank or non-concentrated water sample can be passed through the filtering component 20 to ensure that there is no residual contamination in the filter 30 prior to introducing the fluid sample therein. Likewise, as described above, in some embodiments a test can be ran to confirm that the filter 30 has not previously been used.

Figure 5B:
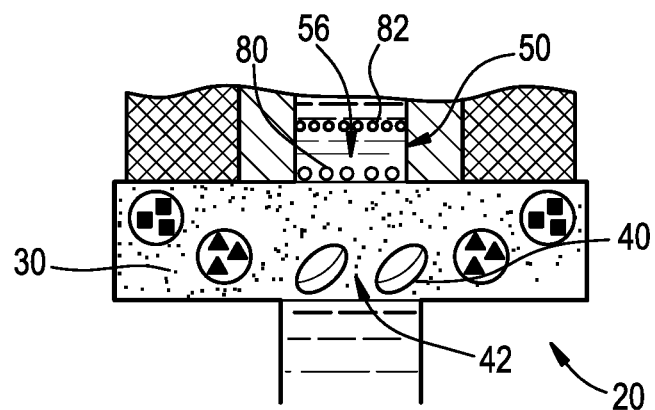
FIG. 5B is a detailed cross-sectional side view of the filtering component of FIG. 5A, the filter having cells (e.g., bacteria) from a fluid sample flowing through the filter captured therein.

FIG. 5B illustrates the fluid sample being drawn into the filtering component 20 through the fluid entrance 26. The fluid sample can flow through the filter inlet 32 to disperse within the filter 30. Once the fluid is filtered, it can be ejected, or otherwise be passed through the filter 30, from the filter outlet 34 and into the channel 56 (via the fluid exit 27 in the illustrated embodiment). Cells 40 are captured in the concentration region 42, which, in the illustrated embodiment, is proximate to a side of the filter 30 furthest from the fluid storage component 50, as shown in FIG. 5B. As greater amounts of the sample flow through the fluid inlet 32 and are ejected through the fluid outlet 34, the concentration of the cells 40 in the concentration region 42 increases.

Figure 5C:
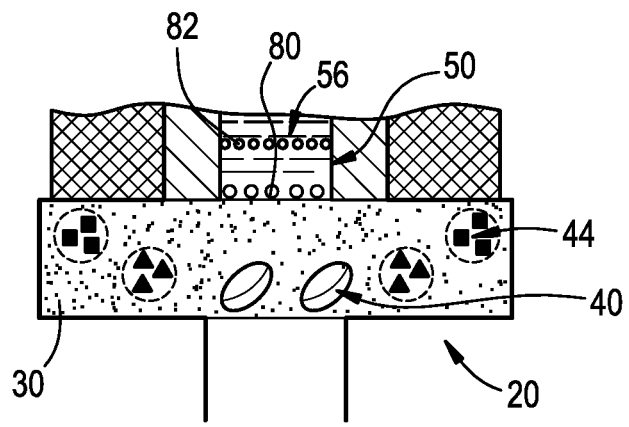
FIG. 5C is a detailed cross-sectional side view of the filtering component of FIG. 5B in which microcapsules of the microencapsulated reagents are being dissolved by the fluid sample.
Figure 5D:
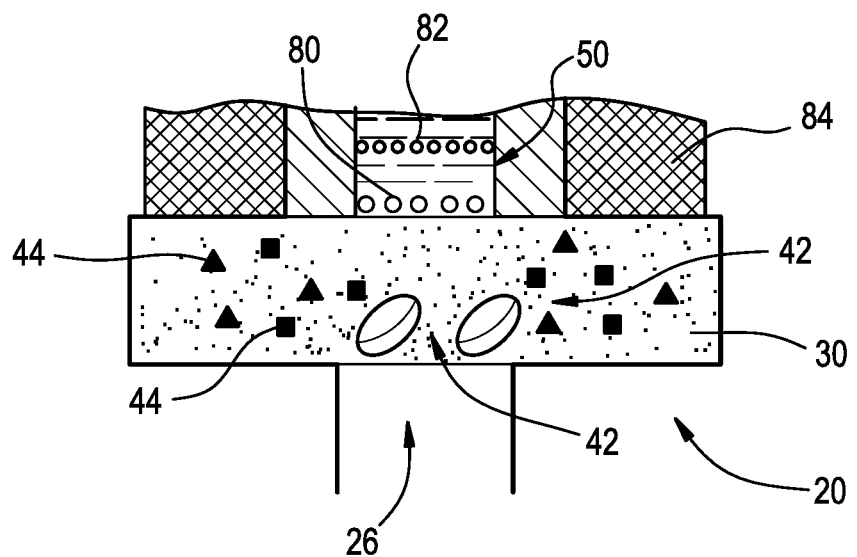
FIG. 5D is a detailed cross-sectional side view of the filtering component of FIG. 5C with reagents of the microencapsulated reagents diffusing within the filter due the microcapsules being dissolved.

During flow of the fluid sample through the filter 30, the fluid sample contacts the microcapsules 46. As shown in FIG. 5C, the fluid dissolves the microcapsules 46 to release the reagents 44. It will be appreciated that the time taken to dissolve the microcapsules 46 is longer than the time taken for the fluid outlet 34 to eject the fluid into the channel 56 such that the reagent 44 does not travel against the flow of fluid and is free to diffuse throughout the filter 30. Alternatively, or additionally, the reagents 44 can be disposed on one or more of the electrodes 80, 82, and, as the electrodes can be located opposite the concentration region 42, the flow of the sample fluid through the filter 30 can cease to allow the reagent 44 to travel to the concentration region 42. Once the reagents 44 diffuse throughout the filter 30, the reagents 44 can diffuse into the cells 40, as shown in FIG. 5D. In embodiments in which reagent is disposed on one or more of the electrodes, the flow of the fluid sample through the filter 30 and into contact with the one or more electrodes 80, 82, and thus the reagents, can cause the reagents to be released in a similar manner. The reagents can then diffuse into the filter 30, for instance by gravity, to interact with the captured cells in the concentration region(s) 42.

Figure 5E:
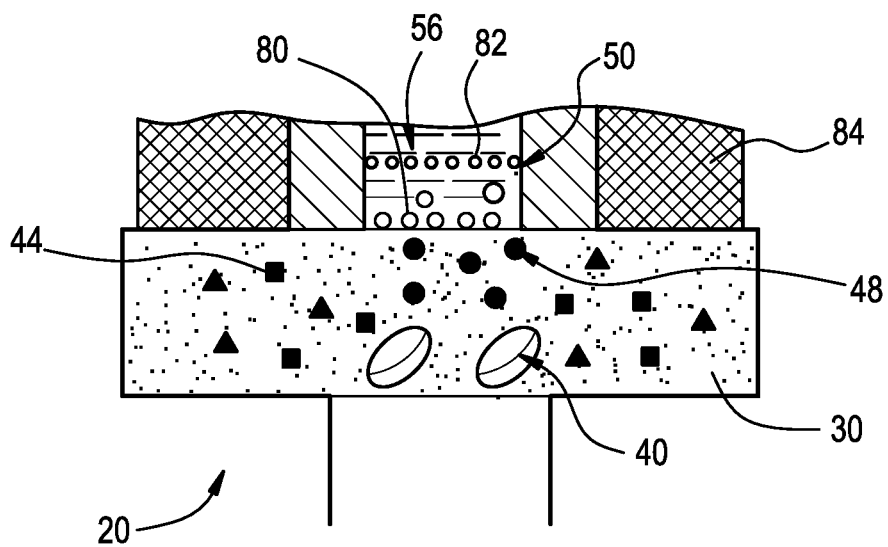
FIG. 5E is a detailed cross-sectional side view of the filtering component of FIG. 5D in which redox species are diffusing through the filter, towards an electrode of the device of FIG. 1A, the redox species being produced by a combination of the reagents and cells.

As discussed above, when the reagent 44 diffuses into the cells 40, the cells 40 can react with the reagent 44 to produce one or more redox species 48. As shown in FIG. 5E, the redox species 48 can diffuse through the filter 30 to the electrodes 80, 82 for detection. The electrodes 80, 82 can be operated, and the reader 86 can detect the electrochemical properties of the redox species 48. Relevant information can then be displayed on a display of the reader 86 and/or can be communicated to another device (e.g., computer, mobile device, smartphone, etc.) for subsequent display. The redox species 48 can travel through the channel 56 and mix with the filtered fluid. It will be appreciated that the heating element 84, or a temperature controller more generally, can regulate the temperature of the filter 30, and thus the associated cells in the concentration region(s) 42, throughout this process to maintain an environment suitable for the reagent 44 to diffuse throughout the filter 30 and for the redox species 48 to be produced by the cells 40. The heating element 84, or a temperature controller more generally, can likewise regulate other nearby environments, and thus the redox species 48 and other materials and the like disposed therein, as desired.

Once sufficient electrochemical data has been collected, the filtering component 20 can be disconnected from the fluid storage component 50 and discarded. A new filtering component 20 can then be connected to the fluid storage component 50 for further sampling. Alternatively, the same filtering component 20 can be properly cleaned and/or sterilized, and then reused after a new filter 30 is disposed within the same filtering component 20. Still further alternatively, all components of the system, including the filtering component 20 and the filter 30, can be properly cleaned and/or sterilized, and then reused.

Concentration System

FIGS. 6A-6E illustrate an exemplary embodiment of a concentration system 110 for sampling fluid. The concentration system 110 can be used to concentrate the cells (not shown) and detect electrochemical properties of the product of interest (not shown) produced by the cells. Except as indicated below, and as will be readily appreciated by one skilled in the art, the structure and function of the system 110 is substantially the same as that of the device described above, and therefore a detailed description is omitted for the sake of brevity.

In the illustrated embodiment of the concentration system 110, a fluid sample containing cells can be stored in a fluid storage component 150 prior to filtering. The fluid storage component 150 can inject or push the fluid sample into a filtering component 120 to filter the sample and capture cells contained in the sample for subsequent analysis. Once concentrated within the filtering component 120, the cells can produce a product of interest. An analysis component 170 can detect the product of interest and analyze its associated electrochemical properties.

One skilled in the art will appreciate that the filtering component 120, the fluid storage component 150, and the analysis component 170 of the concentration system 110 can include similar features to those discussed with respect to FIGS. 1A-1B above, though each component is divided out differently. For example, as shown, the fluid storage component 150 can include a syringe or other vessel. Rather than drawing the sample fluid and receiving the filtered fluid and products of interest from the filter as discussed above, the fluid storage component 150 in the illustrated embodiment is configured to deliver the fluid sample to the filtering component 120 for sampling. As shown, the filtering component 120 is in fluid communication with the fluid storage component 150. The filtering component 120 can eject filtered fluid out of the membrane to concentrate the cells (e.g., bacteria) within the filtering component 120. The filtered fluid can be configured to interact with the analysis component 170 to release a reagent associated with the analysis component 170, such as being disposed on one or more of the electrodes 180, 182, 185. The reagent can diffuse through the filtered fluid, into the filtering component 120, to diffuse into the concentrated cells and produce the product of interest. Electrochemical properties of the product of interest can be detected by the analysis component 170 after the product of interest is ejected from the filtering component 120.

Figure 6A:
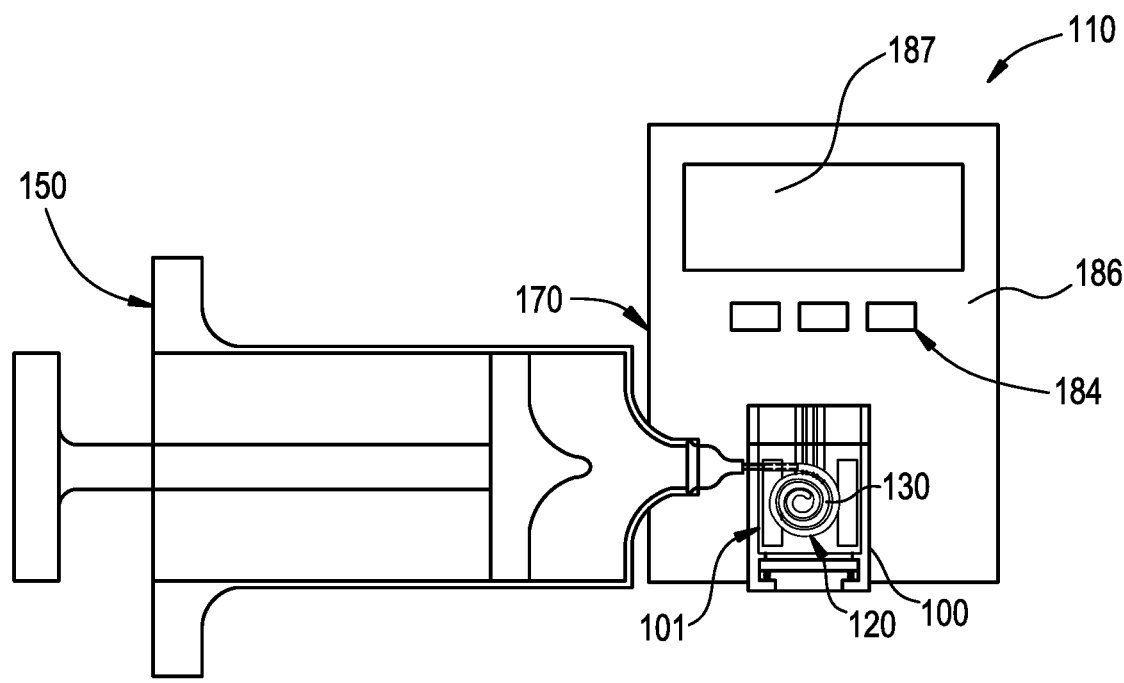
FIG. 6A is a side view of one exemplary embodiment of a system for sampling fluid.
Figure 6B:
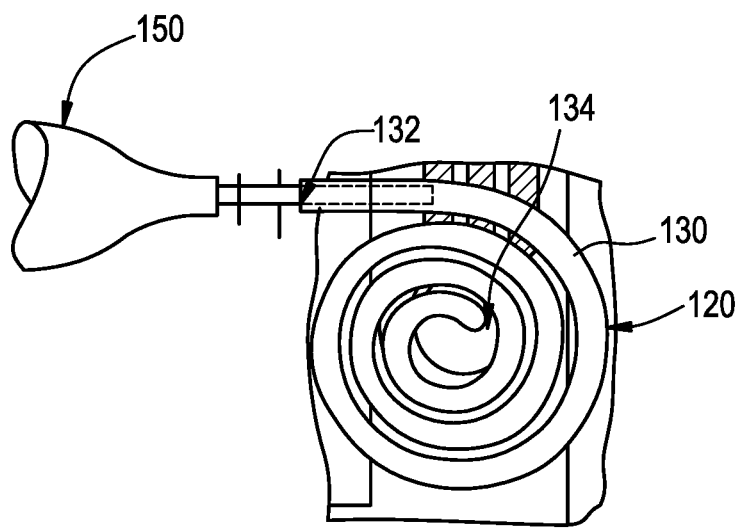
FIG. 6B is a side view of a filtering component of the system of FIG. 6A in fluid communication with a fluid storage component of the system of FIG. 6A.

FIG. 6B illustrates an exemplary embodiment of the filtering component 120 used with the concentration system 110. As shown, the filtering component 120 can include a hollow-fiber membrane 130 having a first end 132 and a second end 134. The first end 132 of the hollow-fiber membrane 130 can attach, or otherwise be associated with, the fluid storage component 150 to receive the fluid sample therein. For example, a syringe of the fluid storage component 150 can protrude into the first end 132 of the hollow-fiber membrane 130 to deliver the fluid sample to the hollow-fiber membrane 130. The hollow-fiber membrane 130 can be made of an artificial polymer such as cellulose acetate, polysulfone, polyethersulfone, and/or polyvinylidene fluoride. The hollow-fiber membrane 130 can be coil-shaped as shown so as to facilitate arrangement of longer lengths of the membrane in a smaller volume of concentration region, though, in some embodiments, the hollow-fiber membrane 130 can be straight, branched, or have various other configurations.

The fluid sample can flow through the hollow-fiber membrane 130 towards the second end 134. A person having ordinary skill in the art will appreciate that as the fluid sample flows, permeate or filtered fluid can travel across the hollow-fiber membrane 130 to concentrate the cells or retentate of the fluid sample as it travels towards the second end 134. In some embodiments, a dead-end hollow-fiber membrane can be used such that the concentrated cells cannot exit the membrane because the second end 134 is sealed. Alternatively, in some embodiments, the second end 134 can have an opening that can allow the filtered fluid to exit the system. The concentrated cells can be collected in a porous membrane or filter, while the filtered fluid can be collected and exit the system, e.g., collected in a second fluid storage component, to be discarded.

Figure 6C:
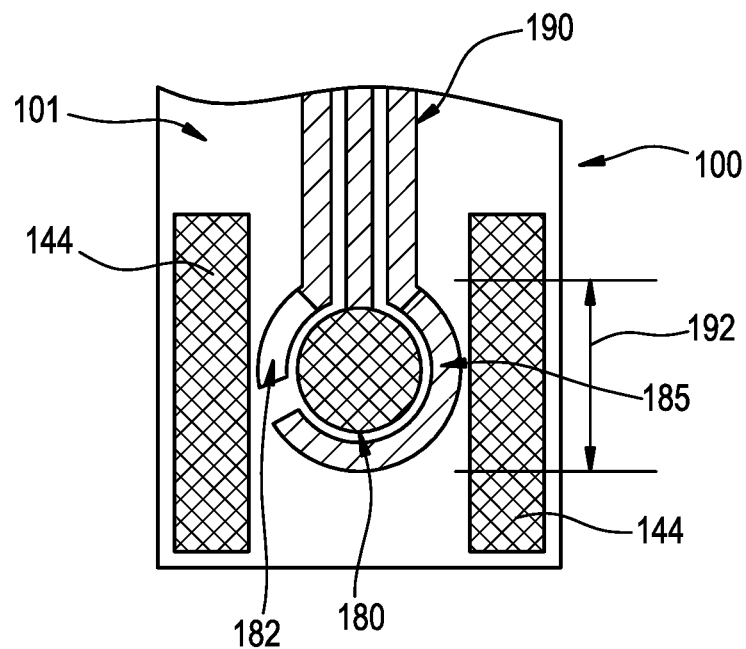
FIG. 6C is a side view of a surface of an analysis component of the system of FIG. 6A that includes a co-planar electrode configuration.

FIG. 6C illustrates an exemplary embodiment of an electrode configuration 100 formed on a surface 101 of the analysis component 170 and used with the concentration system. As shown, the electrode configuration 100 can be co-planar such that the filtration component 120 can rest along the surface 101 of the analysis component 170. The co-planar electrode configuration 100 can include a working electrode 180, a reference electrode 182, and a counter electrode 185 thereon, the combination thereof sometimes being referred to as a co-planar combination electrode. The co-planar combination electrode can include the surface 101 on which the electrodes 180, 182, and 185 are disposed, along with the electrodes 180, 182, and 185. Each of the electrodes 180, 182, 185 can include electrode leads 190 that extend from each electrode along the surface 101. The electrode leads 190 can be covered with dielectric, e.g., parylene, for preventing stray electrical currents due to exposed regions of electrode leads in contact with the fluid sample.

As shown, the working electrode 180 can be located at a center of the co-planar electrode configuration 100. The working electrode 180 can be disc shaped, though, in some embodiments, the working electrode 180 can be shaped rectangular, square, or so forth. The working electrode 180 can be can be made of carbon functionalized with Copper(II) Phthalocyanine. The counter electrode 185 and the reference electrode 182 can be positioned around the working electrode 180 to create a potential between the electrodes 180, 182, 185. A person having ordinary skill in the art will understand that the reference electrode 182 can be made of silver or silver chloride. In some embodiments, the reference electrode 182 can be encapsulated with a hydrogel or a polymer containing chloride so as to minimize the cells' exposure to toxic levels of silver. The counter electrode can be made of various materials as provided for herein for electrodes or otherwise known to those skilled in the art, and in some exemplary embodiments it is a carbon counter electrode.

It will be appreciated that one or more portions of the electrodes 180, 182, 185 can be exposed, e.g., free from encapsulation. As shown in FIG. 6C, the counter electrode 185 includes an exposed region 192. Typically, the exposed region 192 is proximate to one or more reagents 144 that are disposed on some portion of co-planar combination electrode (i.e., the surface 101 and/or one or more of the electrodes 180, 182, and 185), as discussed further below, though, in some embodiments, the exposed region 192 can be a portion of the surface 101 that is farthest from the reagent(s) 144. The exposed region 192 can be configured to detect electrochemical properties of the reagents 144 and the redox species that contact the exposed region 192 after being ejected from the filtering component 120.

The co-planar electrode configuration 100 can include one or more reagents 144 on the surface 101 and/or on one or more of the electrodes 180, 182, and 185. The reagents 144 can be encapsulated by blending with a stable binder (e.g. one or more of polysaccharides, glycoproteins, gum arabic, or other substances which will not interfere with desired cellular function or detection of the redox species) and depositing the reagent-binder combination onto the electrode 100. The reagent-binder combination can be deposited by drop casting, screen-printing, or another method known to a person having ordinary skill in the art. The reagent-binder combination can be deposited along the electrode 100 as shown, though the reagent-binder combination can be deposited onto one or more of the working electrode 180, the reference electrode 182, and/or the counter electrode 185. A person skilled in the art, in view of the present disclosures, will understand other ways by which the reagents 144 can be associated with the system 110.

The stable binder can include a gum, e.g. gum arabic, one or more polysaccharides (e.g. mannitol, erythritol, maltose monohydrate, or others), or another substance known to one of ordinary skill in the art that is stable under dry, room-temperature conditions. Stable binders can protect the reagents 144 from degradation via hydrolysis and other mechanisms. It will be appreciated that additional binder can be deposited on top of the reagent-binder combination in order to improve stability and facilitate timed release of the reagent 144.

The analysis component 170 can include a reader 186 to measure current at potentials of interest. For example, the reader 186 can be in communication with one or more of the electrodes 180, 182, 185 to measure such electrochemical properties of the product of interest at the co-planar combination electrode, for instance as discussed above with respect to FIG. 3B.

A person skilled in the art will appreciate that the reader can include a power supply, a display, a data interface, electronic circuitry for performing electrochemical measurement, electronic circuitry for controlling temperature, and any other features that output results of detection of the electrochemical properties of the device. The reader 186 can include a display 187, as shown, which can be configured to display the electrochemical properties measured by the reader 186, or information related thereto. It will be appreciated that the reader 186 can be attached or wired to the co-planar combination electrode 100, and/or can communicate with the co-planar combination electrode 100 wirelessly (e.g., via Bluetooth or another means of communication known to those skilled in the art). Other data communication links are also possible, as described in the present application or otherwise known by those skilled in the art.

The reader 186 can also have a temperature controller, such as a heating element 184, incorporated therein. The heating element 184 can be integrated, attached, or otherwise associated with the reader to regulate the temperature of the system 110 to maintain the desired cell behavior, e.g. enzyme activity, of β-Galactosidase, in the cells. As discussed above, the heating element 184 can also ensure that the system 110 is not detecting electrochemical properties of undesired materials. Concentrated cells can be maintained at a desired temperature in order to improve selectivity for desired strains, as some chemical responses such as β-Galactosidase activity of *E. coli* will occur for the desired thermotolerant strain at elevated temperatures but will not occur for common interfering strains at these temperatures.

Figure 6D:
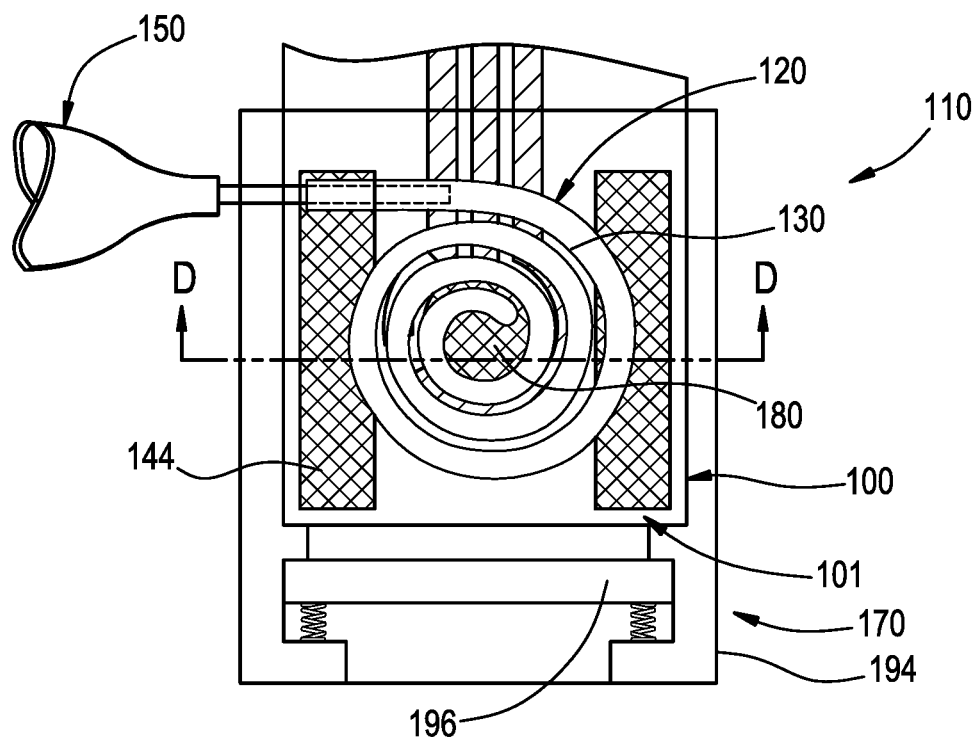
FIG. 6D is a side view of the filtering component of FIG. 6B disposed on the surface of the analysis component of FIG. 6C.

FIG. 6D illustrates the hollow-fiber membrane 130 disposed on the surface 101 of the analysis component 170. The hollow-fiber membrane 130 is positioned on the surface 101 such that the second end 134 rests on top of the working electrode 180 and the coiled body of the hollow-fiber membrane 130 contacts the reference electrode 182 and the counter electrode 185, the dielectrics 190, and the one or more reagents 144 disposed on the surface 101 and/or on one or more of the electrodes 180, 182, and 185. Filtered fluid that permeates across the hollow-fiber membrane 130 can interact with the reagents 144 to activate the binder on the surface 101 and/or on one or more of the electrodes 180, 182, and 185 to disperse the reagents 144 throughout the concentration system 110.

Figure 6E:
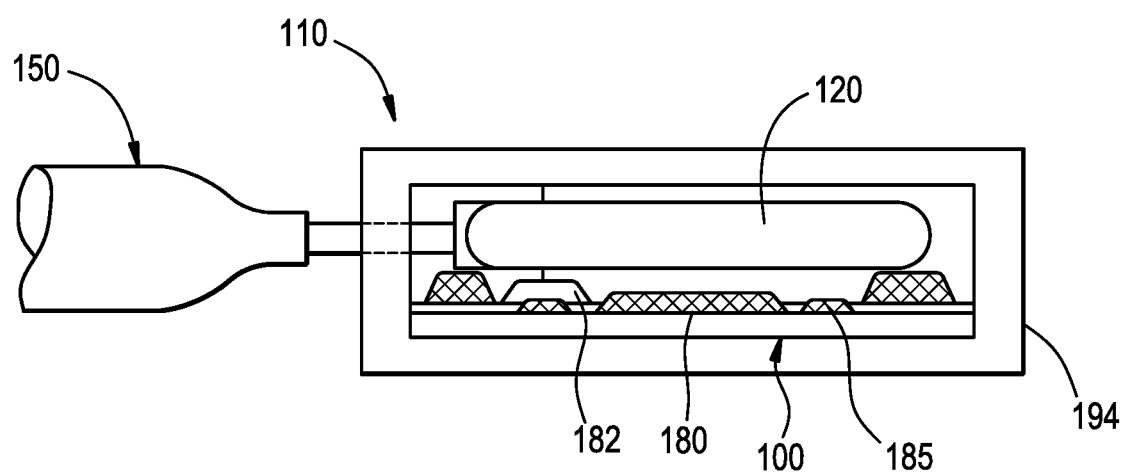
FIG. 6E is a cross-sectional side view of the filtering component and electrodes of the co-planar electrode configuration of FIG. 6D taken along the line D-D.

The concentration system 110 can be disposed in a housing 194. As shown in FIGS. 6D-6E, the housing 194 can encase the hollow-fiber membrane 130 and the co-planar electrode configuration 100 to contain the filtered fluid that permeates across the hollow-fiber membrane 130 within the system 110. The housing 194 can retain the filtered fluid for such time as the binder can activate and release the reagent(s) 144. The housing 194 can be made from a polymer or another durable substance to maintain the system 110 as a single unit.

Similar to the device 10 discussed above, the concentration system 110 can include one or more check valves 196 for exiting permeate. For example, as shown in FIG. 6D, the check valve(s) 196 can allow the permeate and the filtered fluid that exits the membrane to exit the system. The valve(s) 196 can ensure that the system does not flood and act as a natural barrier to prevent foreign fluids and materials from entering the system 110.

Once the binder is activated and the one or more reagents 144 disperse through the system 110, the reagents 144 can diffuse across the hollow-fiber membrane 130 to the concentrated cells. As discussed with respect to FIGS. 1A-1B above, the reagents 144 can diffuse into the cells to produce a product of interest. The product of interest can diffuse across the hollow-fiber membrane 130 to contact the electrodes 180, 182, 185. Once a sufficient concentration of the product of interest has permeated the hollow-fiber membrane 130 into the system 110, the electrodes 180, 182, 185 and the reader 186 can detect electrochemical properties of the cells and display them on the display 187. Alternatively, or additionally, the reader 186 can communicate the properties and related information and/or results derivable from the detected properties to another location (e.g., a computer, a mobile device, a smartphone, etc.). After measurements are recorded, the system 110 can be flushed and recalibrated for future sampling. It will be appreciated that one or more of the fluid storage component 150, the filtering component 120 (e.g., the hollow-fiber membrane 130), and the analysis component (e.g., the electrodes 180, 182, 185) can be disposed of after sampling is performed and measurements are recorded, though, in some embodiments, each of the above listed components can be cleaned and/or sterilized as appropriate and reused.

The illustrated and described systems, devices, methods, configurations, shapes, and sizes are in no way limiting. A person skilled in the art, in view of the present disclosures, will understand how to apply the teachings of one embodiment to other embodiments either explicitly or implicitly provided for in the present disclosures. Further, a person skilled in the art will appreciate further features and advantages of the present disclosure based on the above-described embodiments. Accordingly, the disclosure is not to be limited by what has been particularly shown and described, except as indicated by the appended claims. Additional details related to the present disclosure can be found in a document entitled "Method for point-of-use testing for bacteriological water contamination in resource-limited environments," and U.S. Provisional Application No. 62/409, 541 filed on Oct. 18, 2016. All publications and references cited herein, including the aforementioned document and provisional application, are expressly incorporated herein by reference in their entirety.

What is claimed is:

1. A system for sampling fluid, comprising:
a filter housing having an inlet and an outlet;
at least one filter disposed in the filter housing;
a fluid storage chamber in fluid communication with the at least one filter;
at least one electrode in fluid communication with the at least one filter; and
one or more reagents located at one or more of the following locations: in filter housing; in the at least one filter; or on the at least one electrode, wherein the one or more reagents is configured to diffuse to at least one concentration region disposed in the filter housing at least when the one or more reagents are located on the at least one electrode,
wherein the filter housing and the at least one filter are configured such that at least one of one or more cells, one or more particles, or one or more molecules contained within a fluid sample that is passed into the filter housing via the inlet becomes located at the at least one concentration region disposed in the filter housing and reacts with the one or more reagents to produce one or more redox species, the one or more redox species being part of fluid from the fluid sample and other material that passes out of the filter housing via the outlet, and
wherein the one or more electrodes of the at least one electrode is configured to measure one or more electrochemical properties of the produced one or more redox species.

2. A system for sampling fluid, comprising,
a filter housing;
a fluid storage chamber;
at least one filter disposed in the filter housing and in fluid communication with the fluid storage chamber, the at least one filter and the filter housing sharing an inlet and an outlet that form a fluid path between the at least one filter and the fluid storage chamber;
at least one electrode in fluid communication with the at least one filter; and
one or more reagents located at one or more of the following locations: in the filter housing; in the at least one filter; or on the at least one electrode, wherein the one or more reagents is configured to diffuse to at least one concentration region disposed in the filter housing at least when the one or more reagents are located on the at least one electrode,
wherein the filter housing and the at least one filter are configured such that at least one of one or more cells, one or more particles, or one or more molecules contained within a fluid sample that is passed into the filter housing via the inlet becomes located at the at least one concentration region disposed in the filter housing and reacts with the one or more reagents to produce one or more redox species, the one or more redox species being part of fluid from the fluid sample and other material that passes out of the filter housing via the outlet, and
wherein the one or more electrodes of the at least one electrode is configured to measure one or more electrochemical properties of the produced one or more redox species.

3. The system of claim 1, further comprising:
a fluid introducer configured to introduce a fluid sample into the inlet of the filter housing.

4. The system of claim 1, wherein the fluid storage chamber further comprises:
a first portion; and
a second portion, the first portion being disposed closer to the at least one filter than the second portion and having a width or diameter that is narrower than a width or diameter of the second portion.

5. The system of claim 4, wherein the one or more electrodes are disposed proximate to the first portion.

6. The system of claim 1, further comprising:
at least one of a membrane or a coating,
wherein the at least one of a membrane or a coating is located such that it has at least one of the following locations:
(1) disposed in the filter housing;
(2) disposed on one or more electrodes of the at least one electrode; or
(3) disposed between one or more electrodes of the at least one electrode and at least one of the inlet, the outlet, or the at least one filter,
wherein the at least one of a membrane or a coating is configured to allow at least one of the one or more redox species or the one or more reagents to diffuse through the at least one of a membrane or a coating, and
wherein the at least one of a membrane or a coating is configured to limit a passage of at least one of one or more particles or one or more molecules in the fluid sample on the basis of one or more properties of the respective one or more particles and one or more molecules.

7. The system of claim 1, further comprising:
a temperature controller disposed proximate to the at least one filter, the temperature controller being configured to regulate a temperature of at least one of one or more cells, one or more particles, or one or more molecules contained within a fluid sample located in the at least one concentration region disposed in the filter housing.

8. The system of claim 1, wherein at least one reagent of the one or more reagents is encapsulated in one or more other materials, the one or more other materials being configured such that the at least one reagent of the one or more reagents is dissolved into the fluid sample after a specified amount of time has passed once the one or more materials of the at least one encapsulated reagent has been contacted by the fluid sample.

9. The system of claim 1, wherein at least one reagent of the one or more reagents is encapsulated in one or more other materials, the one or more other materials being configured such that at least one reagent of the one or more reagents is dissolved into the fluid sample after a temperature of the one or more other materials reaches a threshold value.

10. The system of claim 1, wherein at least one reagent of the one or more reagents is disposed within one or more polymeric microcapsules, the one or more polymeric microcapsules being configured to dissolve when contacted by a fluid sample that has been advanced towards the at least one filter.

11. The system of claim 1, wherein at least one reagent of the one or more reagents is at least partially embedded within a binder, the binder being configured to dissolve when contacted by a fluid sample that has been passed into the at least one filter.

12. The system of claim 1, wherein the fluid storage chamber comprises a syringe having a housing that defines the fluid storage chamber and a plunger disposed within the fluid storage chamber, the syringe being configured such that moving the plunger away from the at least one filter draws a fluid sample through the inlet and into the filter, and fluid from the fluid sample and other material are passed out of the outlet, towards the at least one electrode, and into the fluid storage chamber.

13. The system of claim 1, wherein the fluid storage chamber comprises a syringe having a housing that defines the fluid storage chamber and a plunger disposed within the fluid storage chamber, the syringe being configured such that moving the plunger towards the at least one filter pushes a fluid sample containing at least one of one or more cells, one or more particles, or one or more molecules through the inlet and into the filter, and fluid from the fluid sample and other material are passed out of the outlet, towards the at least one electrode.

14. The system of claim 1, further comprising:
a filtering component that includes the filter housing and the filter; and
a fluid storage component that includes the fluid storage container,
wherein the filtering component is removably and replaceably coupled to the fluid storage component such that the fluid storage component can be reused by coupling a second filtering component that includes at least one filter to the fluid storage component.

15. A method of measuring fluid contamination, comprising:
passing a fluid sample that includes at least one of one or more cells, one or more particles, or one or more molecules into a filter, thereby causing the following to occur:
the at least one of one or more cells, one or more particles, or one or more molecules contained within the fluid sample become concentrated within a region of the filter;
fluid from the fluid sample initiates a release of one or more reagents;
the one or more reagents reacts with the at least one of one or more cells, one or more particles, or one or more molecules to produce one or more redox species; and
the produced one or more redox species travels to an analysis component that includes at least one electrode; and
operating the at least one electrode to measure one or more electrochemical properties of the produced one or more redox species, the one or more measured electrochemical properties being indicative of an amount of fluid contamination.

16. The method of claim 15, wherein the one or more reagents are disposed in the filter such that fluid in the filter initiates the release of the one or more reagents.

17. The method of claim 15, wherein the one or more reagents are disposed on the at least one electrode such that fluid that passes through the filter initiates the release of the one or more reagents into the filter.

18. The method of claim 15, wherein the produced one or more redox species comprises one or more signaling molecules.

19. The method of claim 15, further comprising:
detecting if the filter has been previously used for filtering a fluid sample based on an electrochemical output generated by one or more chemicals disposed in the filter.

20. The method of claim 15, further comprising:
controlling a temperature of the produced one or more redox species.

21. The method of claim 15, further comprising:
incubating the one or more reagents and the at least one of one or more cells, one or more particles, or one or more molecules contained within the fluid within the filter to produce sufficient redox species for the one or more redox species to have the one or more electrochemical properties measured.

\* \* \* \* \*